United States Patent
Wright (12)

(10) Patent No.: US 11,443,560 B1
(45) Date of Patent: Sep. 13, 2022

(54) VIEW LAYOUT CONFIGURATION FOR INCREASING EYE CONTACT IN VIDEO COMMUNICATIONS

(71) Applicant: Zoom Video Communications, Inc., San Jose, CA (US)

(72) Inventor: Gregory Wright, Cameron Park, CA (US)

(*) Notice: Subject to any disclaimer, the term of this patent is extended or adjusted under 35 U.S.C. 154(b) by 0 days.

(21) Appl. No.: 17/343,727

(22) Filed: Jun. 9, 2021

(51) Int. Cl.
| | |
|---|---|
| *H04N 7/15* | (2006.01) |
| *G06V 40/60* | (2022.01) |
| *G06F 3/0482* | (2013.01) |
| *H04N 5/272* | (2006.01) |
| *G06F 3/0485* | (2022.01) |
| *G06V 10/44* | (2022.01) |
| *G06V 20/00* | (2022.01) |
| *G06V 40/16* | (2022.01) |

(52) U.S. Cl.
CPC ............ *G06V 40/67* (2022.01); *G06F 3/0482* (2013.01); *G06F 3/0485* (2013.01); *G06V 10/44* (2022.01); *G06V 20/00* (2022.01); *G06V 40/166* (2022.01); *H04N 5/272* (2013.01); *H04N 7/15* (2013.01)

(58) Field of Classification Search
CPC .. G06K 9/00; G06K 9/46; H04N 7/15; H04N 7/147; H04N 5/272; G06F 3/0482; G06F 3/0485
USPC .......................................... 348/14.01–14.16
See application file for complete search history.

(56) References Cited

U.S. PATENT DOCUMENTS

| | | | | |
|---|---|---|---|---|
| 2010/0002069 A1* | 1/2010 | Eleftheriadis | ...... | H04N 21/4858 348/14.08 |
| 2015/0334313 A1* | 11/2015 | Chougle | .............. | H04N 5/2624 348/14.07 |
| 2021/0405865 A1* | 12/2021 | Faulkner | ................ | H04N 7/147 |

\* cited by examiner

*Primary Examiner* — Melur Ramakrishnaiah
(74) *Attorney, Agent, or Firm* — Cognition IP, P.C.; Edward Steakley

(57) ABSTRACT

Methods, systems, and apparatus, including computer programs encoded on computer storage media relate to a method for providing an active pane within a communication platform. The system displays video of a video conference with one or more participants. A view menu is configured to receive selection of a view layout. Selection of an active pane view may be received via the view menu. The system may display a draggable active pane. A drag input from the user is received to move the active pane to a new location on screen near a camera capturing video of the user in the video conference. The system displays the active pane on the screen at the new location near the camera.

21 Claims, 14 Drawing Sheets

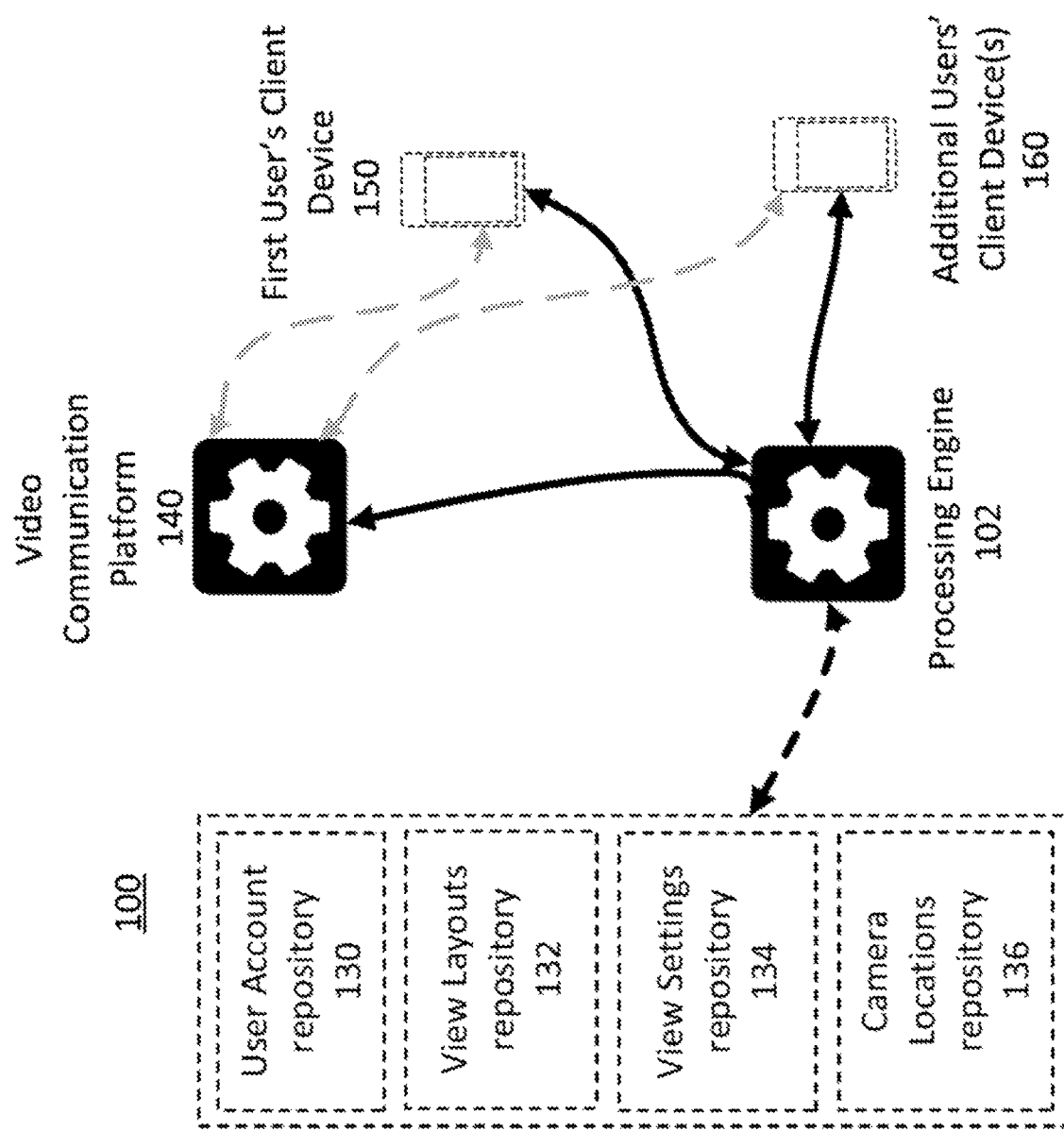

VIEW LAYOUT CONFIGURATION FOR INCREASING EYE CONTACT IN VIDEO COMMUNICATIONS

FIELD OF INVENTION

The present invention relates generally to digital communication, and more particularly, to systems and methods for increasing eye contact between participants in video communications.

BACKGROUND

Eye contact can be an important aspect of non-verbal communications in human interactions. Eye contact can be a sign that a listener is paying close attention and is focused on what the speaker is saying. Moreover, it can be an important tool for building trust and connection. Current state-of-the-art video conferencing systems lack functionality for simulating eye contact at the level that can occur in real-world face-to-face interactions. In a video conferencing system, participants are often looking at content on their screens, such as a presentation or video of other participants. However, the camera capturing video of the participants is often in a different location than the content that the participants are viewing on their screens. For example, cameras are often built into the top or bottom of a screen on certain devices or is attached above, below, or to the side of the screen when the user is using a camera that is separate from the device. On the other hand, the content may be displayed in the center, or elsewhere on the screen, that is apart from the camera. This configuration causes participants to appear in the video conference to be staring off into space, rather than making eye contact with the other participants. Current state-of-the-art video conference systems display content on the screen without regard to where to place it to orient participants to look toward their cameras and maximize the appearance of eye contact.

Thus, there is a need in the field of digital communication to create a new and useful system and method for providing video communications with features that enhance eye contact for the participants. It would be desirable for a video communications system to associate the location of content displayed to participants and the location of the participants' cameras in a manner to encourage participants to look in the direction of their cameras. In some embodiments, it would be desirable for a video communications system to automatically display content in a location to encourage participants to look in the direction of their cameras.

SUMMARY

In general, one innovative aspect of the subject described in this specification can be embodied in systems, computer readable media, and methods that includes operations for displaying an active pane. One system performs the operations of displaying on a screen, by a computer system, video of a video conference with one or more video conference participants. The system plays audio from the one or more video conference participants. The system displays a view menu, the view menu configured to receive a selection of a view layout, wherein the view layouts include a speaker view, a gallery view, and an active pane view. The system receives, via the view menu, a selection of the active pane view. The system, in response to receiving the selection of the active pane view, displays a draggable active pane, wherein the active pane automatically switches between displaying video conference participants based on which video conference participant is speaking and the dimensions of the active pane are smaller than full screen. The system receives a user input from a user on the active pane and displaying a visual indicator at the location of the user input that the active pane is draggable. The system receives a drag input from the user and moves the active pane to a new location on the screen, the new location being near a camera capturing video of the user in the video conference. The system displays the active pane on the screen at the new location near the camera.

In another aspect of the system, the system accesses system data to gather information about a device model of the computer system. The system accesses a database storing information about built-in camera physical locations for a plurality of device models to retrieve a built-in camera physical location for the device model of the computer system. The system converts from the built-in camera physical location for the device model of the computer system to screen coordinates to generate screen coordinates on the computer system near the built-in camera physical location. The system displays the active pane at the screen coordinates on the computer system near the built-in camera physical location.

In another aspect of the system, the system analyzes the captured video of the user in the video conference from the camera to detect one or more perspective lines. The system determines a physical location of the camera capturing video of the user in the video conference based on the one or more perspective lines. The system converts from the physical location of the camera to screen coordinates to generate screen coordinates on the computer system near the physical location of the camera. The system displays the active pane at the screen coordinates on the computer system near the physical location of the camera.

In another aspect of the system, the system analyzes the captured video of the user in the video conference from the camera to detect a face and a facing direction of the face. The system determines whether the face is looking at the camera, and, when the face is not looking at the camera, determines an angle to rotate the face to look at the camera. The system generates screen coordinates on the computer system that, when viewed by the user, rotate the face to look at the camera. The system displays the active pane at the screen coordinates on the computer system that, when viewed by the user, rotate the face to look at the camera.

In another aspect of the system, the system determines a boundary about a first video conference participant in a set of video frames, wherein the boundary has an interior portion and an exterior portion. The system generates, for display on one or more devices, a filtered video depicting the interior portion depicting imagery of the first video conference participant overlaid on a transparent or translucent background. The system displays in the active pane the filtered video of the first video conference participant.

In another aspect of the system, the system displays an opacity control setting for adjusting the opacity of the background on which the first video conference participant is overlaid. The system receives an input opacity from the opacity control setting and adjusts the opacity of the background on which the first video conference participant is overlaid according to the input opacity.

In another aspect of the system, the system displays shared content behind the active pane, the shared content comprising a view of content shared by one of the video conference participants. The shared content is visible on the screen through the transparent or translucent background on which the first video conference participant is overlaid.

Further areas of applicability of the present disclosure will become apparent from the detailed description, the claims and the drawings. The detailed description and specific examples are intended for illustration only and are not intended to limit the scope of the disclosure.

BRIEF DESCRIPTION OF THE DRAWINGS

The present disclosure will become better understood from the detailed description and the drawings, wherein:

FIG. 1A is a diagram illustrating an exemplary environment in which some embodiments may operate.

DETAILED DESCRIPTION

Figure 1B:
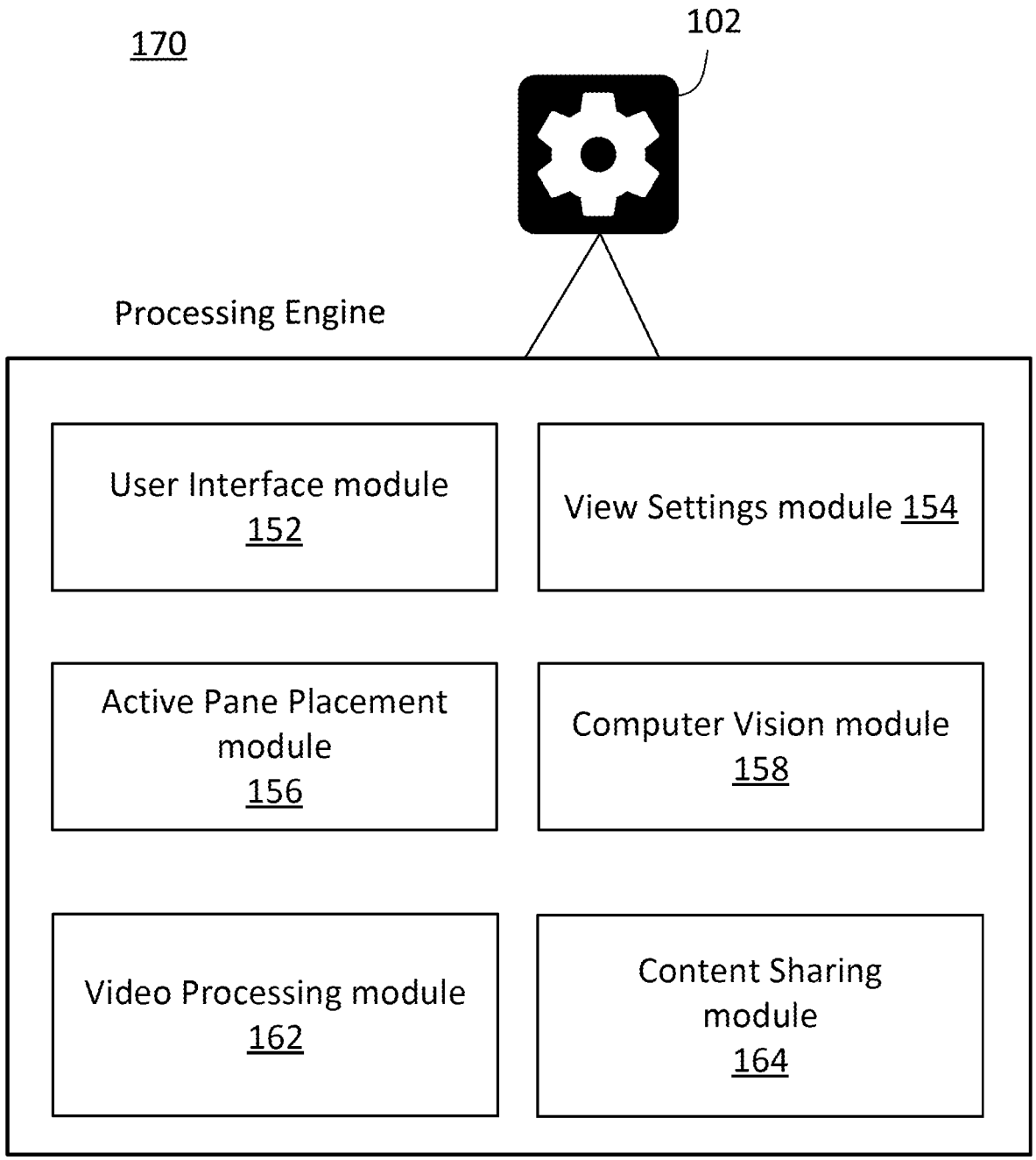
FIG. 1B is a diagram illustrating an exemplary computer system that may execute instructions to perform some of the methods herein.

In this specification, reference is made in detail to specific embodiments of the invention. Some of the embodiments or their aspects are illustrated in the drawings.

For clarity in explanation, the invention has been described with reference to specific embodiments, however it should be understood that the invention is not limited to the described embodiments. On the contrary, the invention covers alternatives, modifications, and equivalents as may be included within its scope as defined by any patent claims. The following embodiments of the invention are set forth without any loss of generality to, and without imposing limitations on, the claimed invention. In the following description, specific details are set forth in order to provide a thorough understanding of the present invention. The present invention may be practiced without some or all of these specific details. In addition, well known features may not have been described in detail to avoid unnecessarily obscuring the invention.

In addition, it should be understood that steps of the exemplary methods set forth in this exemplary patent can be performed in different orders than the order presented in this specification. Furthermore, some steps of the exemplary methods may be performed in parallel rather than being performed sequentially. Also, the steps of the exemplary methods may be performed in a network environment in which some steps are performed by different computers in the networked environment.

Some embodiments are implemented by a computer system. A computer system may include a processor, a memory, and a non-transitory computer-readable medium. The memory and non-transitory medium may store instructions for performing methods and steps described herein.

Many other possibilities and options can be contemplated for this use case and others, as will be described in further detail throughout I. Exemplary Environments FIG. 1A is a diagram illustrating an exemplary environment in which some embodiments may operate. In the exemplary environment 100, a first user's client device 150 and one or more additional users' client device(s) 160 are connected to a processing engine 102 and, optionally, a video communication platform 140. The processing engine 102 is connected to the video communication platform 140, and optionally connected to one or more repositories and/or databases, including a user account repository 130, view layouts repository 132, a view settings repository 134, and/or a camera locations repository 136. One or more of the databases may be combined or split into multiple databases. The first user's client device 150 and additional users' client device(s) 160 in this environment may be computers, and the video communication platform server 140 and processing engine 102 may be applications or software hosted on a computer or multiple computers which are communicatively coupled via remote server or locally.

The exemplary environment 100 is illustrated with only one additional user's client device, one processing engine, and one video communication platform, though in practice there may be more or fewer additional users' client devices, processing engines, and/or video communication platforms. In some embodiments, one or more of the first user's client device, additional users' client devices, processing engine, and/or video communication platform may be part of the same computer or device.

In an embodiment, the first user's client device 150 and additional users' client devices 160 may perform the method 200 (FIG. 2) or other method herein and, as a result, provide an active pane view within a video communication platform. In some embodiments, this may be accomplished via communication with the first user's client device 150, additional users' client device(s) 160, processing engine 102, video communication platform 140, and/or other device(s) over a network between the device(s) and an application server or some other network server. In some embodiments, the processing engine 102 is an application, browser extension, or other piece of software hosted on a computer or similar device or is itself a computer or similar device configured to host an application, browser extension, or other piece of software to perform some of the methods and embodiments herein.

The first user's client device 150 and additional users' client device(s) 160 are devices with a display configured to present information to a user of the device. In some embodiments, the first user's client device 150 and additional users' client device(s) 160 present information in the form of a user interface (UI) with UI elements or components. In some embodiments, the first user's client device 150 and additional users' client device(s) 160 send and receive signals and/or information to the processing engine 102 and/or video communication platform 140. The first user's client device 150 is configured to perform functions related to presenting and playing back video, audio, documents, annotations, and other materials within a video presentation (e.g., a virtual class, lecture, webinar, or any other suitable video presentation) on a video communication platform. The additional users' client device(s) 160 are configured to viewing the video presentation, and in some cases, presenting material and/or video as well. In some embodiments, first user's client device 150 and/or additional users' client device(s) 160 include an embedded or connected camera which is capable of generating and transmitting video content in real time or substantially real time. For example, one or more of the client devices may be smartphones with built-in cameras, and the smartphone operating software or applications may provide the ability to broadcast live streams based on the video generated by the built-in cameras. In some embodiments, the first user's client device 150 and additional users' client device(s) 160 are computing devices capable of hosting and executing one or more applications or other programs capable of sending and/or receiving information. In some embodiments, the first user's client device 150 and/or additional users' client device(s) 160 may be a computer desktop or laptop, mobile phone, virtual assistant, virtual reality or augmented reality device, wearable, or any other suitable device capable of sending and receiving information. In some embodiments, the processing engine 102 and/or video communication platform 140 may be hosted in whole or in part as an application or web service executed on the first user's client device 150 and/or additional users' client device(s) 160. In some embodiments, one or more of the video communication platform 140, processing engine 102, and first user's client device 150 or additional users' client devices 160 may be the same device. In some embodiments, the first user's client device 150 is associated with a first user account on the video communication platform, and the additional users' client device(s) 160 are associated with additional user account(s) on the video communication platform.

In some embodiments, optional repositories can include one or more of a user account repository 130, view layouts repository 132, view settings repository 134, and/or camera locations repository 136. The user account repository may store and/or maintain user account information associated with the video communication platform 140. In some embodiments, user account information may include sign-in information, user settings, subscription information, billing information, connections to other users, and other user account information. View layouts repository 132 may store and/or maintain view layouts for displaying views of video communications to users. View layouts may comprise layouts for displaying video and/or content of the video communication platform 140 to users, such as specifying the locations of videos and/or content displayed on a screen. View settings repository 134 may store and/or maintain view settings, which may include user settings regarding which view layouts to the user is using. In some embodiments, video communication platform 140 includes a preset group of view settings from which users to select, and the selected view settings are stored in the view settings repository 134. Camera locations repository 136 may store and/or maintain information about the physical locations of cameras on one or more device models. The optional database(s) may also store and/or maintain any other suitable information for the processing engine 102 or video communication platform 140 to perform elements of the methods and systems herein. In some embodiments, the optional database(s) can be queried by one or more components of system 100 (e.g., by the processing engine 102), and specific stored data in the database(s) can be retrieved.

Video communication platform 140 is a platform configured to facilitate video presentations and/or communication between two or more parties, such as within a video conference or virtual classroom.

FIG. 1B is a diagram illustrating an exemplary computer system 170 with software modules that may execute some of the functionality described herein.

The User Interface module 152 provides system functionality for presenting a user interface to one or more users of the video communication platform 140 and receiving and processing user input from the users. User inputs received by the user interface herein may include clicks, keyboard inputs, touch inputs, taps, swipes, gestures, voice commands, activation of interface controls, and other user inputs. In some embodiments, the User Interface module 152 presents a visual user interface on a screen, via augmented reality (AR)/virtual reality (VR), or other form factors. In some embodiments, the user interface may comprise audio user interfaces such as sound-based interfaces and voice commands.

View Settings module 154 provides system functionality for the configuration and selection of view layouts by users. In some embodiments, view settings module 154 provides user interface controls, such as a menu, for receiving a user input to select a desired view layout. The view settings module 154 may change the current view layout based on the selected view settings and store the selected view settings in the view settings repository 134 for later retrieval.

Active Pane Placement module 156 provides system functionality for placing an active pane. For example, active pane placement module may determine screen coordinates for an active pane on a screen or other display (including AR/VR). An active pane may comprise a pane for displaying content near to a camera of a user. When the user is looking at or near the camera, the appearance of the user making eye contact in the video conference may be greatest. The content in the active pane may comprise video of the user or other users, shared content (such as a shared screen, document, or other content), an indicator or display for the user to look at, or any other content. In some embodiments, the active pane is displayed in an active pane view that may be selected by one or more users of video communication platform 140. Active Pane Placement module 156 may include functionality for manual placement of the active pane based on user input and automatic placement generated by a computer system, such as first user's client device 150, additional users' client devices 160, and/or processing engine 102.

Computer Vision module 158 provides system functionality for performing computer vision operations on images and/or video. Computer Vision module 158 may coordinate with Active Pane Placement module 156 to provide computer vision functionality to analyze video of a user to generate an optimal placement of an active pane for enhanced eye contact. In some embodiments, Computer Vision module 158 may comprise artificial intelligence software and/or hardware, such as machine learning.

Video Processing module 162 provides system functionality for performing video processing. In some embodiments, the Video Processing module 162 performs video processing to manipulate or apply filters to a video. The Video Processing module 162 may generate a video depiction of a user separate from his or her background. The Video Processing module 162 may generate a filtered video depiction of the user on a translucent or transparent background so that content displayed on screen behind the depiction of the user is visible through the translucent or transparent background. In some embodiments, Video Processing module 162 determines a boundary about the user in a captured video, wherein the boundary has an interior portion and an exterior portion. In some embodiments, Video Processing module 162 generates, for display on first user's client device 150 and/or additional users' client devices 160, a filtered video depicting the interior portion depicting imagery of the user overlaid on a transparent or translucent background. In some embodiments, the Video Processing module 162 adjusts the opacity of the exterior portion (e.g., by adjusting alpha values of the exterior portion pixels) to generate the transparent or translucent background. For example, Video Processing module 162 may apply a mask filter or opacity/transparency filter to remove or render transparent the exterior portion. In some embodiments, the Video Processing module 162 may perform compositing by adding a transparent or translucent virtual background in place of the exterior portion. One advantageous usage of Video Processing module 162 is to show video of the user while minimizing occlusion of content on the screen. Moreover, this depiction may make the video appear more personal and can simplify the display and user interface of video communication platform 140.

Content Sharing module 164 provides system functionality for users of the video communication platform 140 to share content during a video communication. Content Sharing module 164 enables sharing content that is not limited to real-time video feeds captured from a camera. Content Sharing module 164 may enable sharing all or portions of a user's screen, one or more windows, a document/file, and other content. In some embodiments, Content Sharing module 164 presents a user interface for content sharing and provides an option for users to share content. In response to user input requesting to share content, the Content Sharing module 164 may present one or more options of types of content to share. In response to user selection of one of the types of content to share, the Content Sharing module 164 may present a picker tool for selection of one or more screens, windows, documents/files, or other content to share. In response to selection of the one or more screens, windows, documents/files, or other content, the Content Sharing module 164 may share or broadcast the content to other users in a video conference on the video communication platform 140.

The above modules and their functions will be described in further detail in relation to exemplary methods and systems below.

View Layouts

Video communication platform 140 may include one or more view layouts. View layouts may comprise layouts for displaying video and/or content of the video communication platform 140 to users, such as specifying the locations of videos and/or content displayed on a screen. In some embodiments, video communication platform 140 includes a preset group of view layouts from which users to select. In some embodiments, view layouts may be modifiable or configurable on-the-fly by users. In some embodiments, the video communication platform 140 may include a speaker view, gallery view, immersive view, and active pane view.

In a speaker view, the user's client device may display a main video display pane that switches between displaying video conference participants based on which video conference participant is speaking. In some embodiments, the speaker view switches between displaying video conference participants to show the participant that is currently speaking in the main display pane. When multiple participants are speaking, the system 100 may select between them to determine which one is displayed in the main display pane as choosing the loudest participant, the participant who was speaking most recently, a pinned participant, a random participant, and so on. In some embodiments, the speaker view includes a threshold time to wait before switching to displaying a different participant (e.g., 2 seconds). In addition to the main video display pane, the speaker view may include a plurality of thumbnail display panes to show additional video conference participants. Each thumbnail display pane may be associated with a single participant and show that participant throughout the video conference (e.g., without switching, unlike the main display pane). The thumbnail display panes may be displayed in a row, grid, or other format and each pane may be movable by the user.

In a gallery view, the user's client device may display a gallery of video display panes where each video display pane shows the video feed of one participant in the video conference. In some embodiments, the video display panes are of equal size, though in other embodiments they may be variably sized. The video display panes may be displayed in a row, grid, or other format and each pane may be movable by the user. In some embodiments, the gallery view receives a user input from the user to switch the position of two video display panes, such as to change the position of video conference participants on the user's screen, and, in response to the user input, switches the position of the two video display panes.

In an immersive view, the user's client device may display multiple video conference participants in a virtual environment to give the appearance of the video conference participants sharing a location. The user device may load a virtual background from storage depicting the virtual environment (e.g., a classroom, lecture hall, café, meeting room, etc.). The virtual background may include one or more preset user positions in the background where video of video conference participants may be displayed. In some embodiments, the preset user positions may be depicted as seats in the virtual environment, for example. The user device may display a main display pane with the virtual background as the background of the pane. At each of the preset user positions, the user device may display video of one of the video conference participants. The Video Processing module 162 may determine a boundary in each user's video, where each boundary has an interior portion and an exterior portion. The Video Processing module 162 generates a filtered video depicting the interior portion depicting imagery of the user overlaid on a transparent background. The filtered video is displayed for each user so that the video of each user shows the user only and not the background captured by their camera, and each user appears to be in the virtual environment.

In an active pane view, the user's client device may display one or more active panes. An active pane may comprise a pane for displaying content near to a camera of a user. The content in the active pane may comprise video of the user or other users, shared content (such as a shared screen, document, or other content), an indicator or display for the user to look at, or any other content. In some embodiments, an active pane may temporarily be displayed at a location that is not near the camera of the user, such as during a configuration or warm up phase. In some embodiments, the active pane may be moved by the user via user input to be placed near the camera of the user. In some embodiments, the active pane may be automatically placed near the camera of the user by the computer system.

In some embodiments, the active pane automatically switches between displaying video conference participants based on which video conference participant is speaking. In some embodiments, the active pane switches between displaying video conference participants to show the participant that is currently speaking. When multiple participants are speaking, the system 100 may select between them to determine which one is displayed in the active pane such as choosing the loudest participant, the participant who was speaking most recently, a pinned participant, a random participant, and so on. In some embodiments, the active pane includes a threshold time to wait before switching to displaying a different participant (e.g., 2 seconds).

In some embodiments, the active pane is pinned to one of the video conference participants. The active pane displays the video of the pinned video conference participant for the duration of the video conference or until that participant is unpinned. In some embodiments, the active pane displays a self-video of the user.

In some embodiments, the active pane displays shared content, such as all or portions of a video conference participant's screen, one or more windows, a document/file, or other content. Content Sharing module 164 may control the sharing of content in the active pane and in other view layouts.

In some embodiments, the active pane includes one or more configuration settings. In some embodiments, the opacity of the active pane is configurable, wherein the system 100 may receive user input setting an opacity and, in response, the system 100 may adjust the opacity of the active pane to the user input opacity. For example, the system 100 may adjust the alpha values of all or a portion of the pixels of the active pane according to the user input opacity. In some embodiments, the shape of the active pane is configurable, and the shape of the active pane may change in response to a user selection or input. In some embodiments, the active pane may be rectangular or square, such as active pane 302. Active pane may be any shape such as a circle, ellipse, polygon, irregular shape, or any other shape. In some embodiments, the size of the active pane is configurable, and the size of the active pane may change in response to a user selection or input. In some embodiments, the edges of the active pane may be dragged by the user to resize the active pane. The system 100, in response to a resizing input by a user, resizes the active pane to a new size according to the size input by the user. In some embodiments, the active pane is configurable between a geometric and a silhouette display mode. In a geometric mode, the active pane displays video of a user, including the background of the user captured from the user's camera, such as active pane 302. In a silhouette mode, the system 100 determines a boundary about the user, wherein the boundary has an interior portion and an exterior portion. The system 100 generates a filtered video depicting the interior portion depicting imagery of the video conference participant overlaid on a transparent or translucent background, such as active pane 342. System 100 may display options for using a geometric mode or a silhouette mode. In response to receiving a user selection of a display mode, the system 100 sets the active pane to use the selected display mode.

In some embodiments, the system 100 includes two different sets of configuration settings for when the user is participating in a video conference as a presenter or just as a participant. Each set of configuration settings may include a set of configuration options as described herein and applies when the user is participating as a presenter or just as a participant, respectively.

II. Exemplary Methods and User Interfaces

Active Pane Placement

Figure 2:
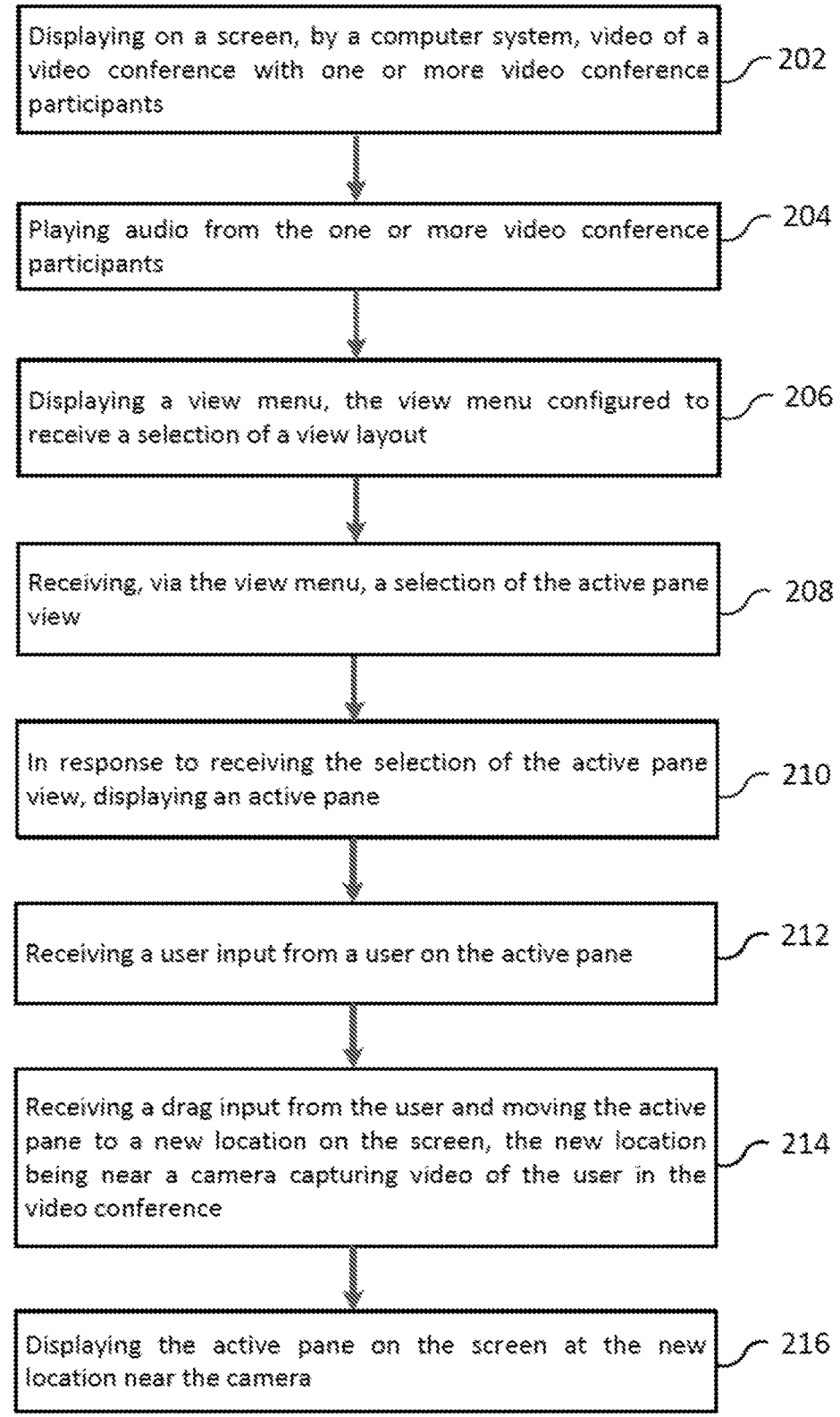
FIG. 2 is a flow chart illustrating an exemplary method that may be performed in some embodiments.

FIG. 2 is a flow chart illustrating an exemplary method 200 that may be performed in some embodiments. In some embodiments, the system 100 provides for an active pane view including an active pane for displaying content near to a camera of a user in order to enhance eye contact among video conference participants. The system 100 provides for selection of the active pane view among a plurality of view layout options. In response to selection of the active pane view, the system 100 displays an active pane. The system 100 may receive user input from the user to move the active pane to a new location on the screen that is near the camera capturing the video conference video of the user, and the system 100 may display the active pane at the new location.

At step 202, the system 100 displays on a screen video of a video conference with one or more video conference participants. In some embodiments, the video is displayed on the screen of the first user's client device 150 or additional users' client devices 160. One or more videos of other video conference participants may be displayed, and the one or more videos may be displayed in a view layout, such as speaker view, gallery view, immersive view, or active pane view. In one embodiment, the view layout in step 202 is not active pane view. The video of each video conference participant may be captured by a camera attached or connected to their client device.

At step 204, the system 100 plays audio from the one or more video conference participants. In some embodiments, the audio is played on the first user's client device 150 or additional users' client devices 160. In some embodiments, the audio is captured from audio input devices of the video conference participants, is processed, and is transmitted for output to the other video conference participants' client devices.

At step 206, the system 100 displays a view menu, the view menu configured to receive a selection of a view layout. In some embodiments, first user's client device 150 or additional users' client devices 160 may comprise a user interface with a view menu. In some embodiments, the view menu is visually displayed and comprises menu items for each available view layout. Upon selection of one of the menu items, the associated view layout is selected and the display on the client device switches to display video and content according to the selected view layout. In some embodiments, the view menu includes menu items for a speaker view, gallery view, immersive view, and active pane view. In some embodiments, the view menu may be displayed on a screen or in AR/VR or other form factors. In some embodiments, the view menu may be an audio menu that aurally describes menu items for each available view layout and receives a user selection of a menu item by voice command.

At step 208, the system 100 receives, via the view menu, selection of the active pane view. In some embodiments, the selection of the active pane view may be via selection of a corresponding menu item in the view menu. The selection of the menu item may be via clicks, keyboard inputs, touch inputs, taps, swipes, gestures, voice commands, activation of interface controls, and other user inputs.

At step 210, the system 100, in response to receiving the selection of the active pane view, displays an active pane. The content in the active pane may comprise video of the user or other users, shared content (such as a shared screen, document, or other content), an indicator or display for the user to look at, or any other content. In some embodiments, the active pane automatically switches between displaying video conference participants based on which video conference participant is speaking. In some embodiments, first user's client device 150 or additional users' client devices 160 display the active pane on the screen of the client device. In some embodiments, the active pane may be displayed at an initial location near a camera capturing video of the user of the client device for the video conference, or in some embodiments, may be displayed at an initial location that is not near the camera, such that it can be moved. In some embodiments, the dimensions of the active pane are smaller than full screen, where the active pane does not take up the entire display. In some embodiments, the client device displays on its screen an indicator that the active pane is movable. For example, the active pane may include a graphical indicator, such as an icon, that it is movable. In some embodiments, the client device changes the mouse cursor to a graphical indicator, such as a hand icon, when the mouse cursor is over the active pane to show that the active pane is draggable. In some embodiments, the client device may display a graphical indicator, such as a hand icon, at the location of a user's touch input to show that the active pane is draggable, when the user touches or drags his or her finger over the active pane.

At step 212, the system 100 receives a user input from a user on the active pane. For example, the user input may comprise a mouse click (e.g., left mouse button down event), touch input, tap, swipe, gestures, activation of interface controls, and other user inputs. In some embodiments, the system 100 displays a visual indicator at the location of the user input that the active pane is draggable. For example, in response to receiving the user input from the user on the active pane, the user's client device may display a graphical indicator, such as a closed hand icon, at the location of the user input on the active pane showing that the user has grabbed the active pane and may drag it to a new location on the screen. In some embodiments, when the user holds down the left mouse button or holds down their finger on a touch screen, and the user input is on the active pane, then the user grabs the active pane.

At step 214, the system 100 receives a drag input from the user and moves the active pane to a new location on the screen, the new location being near a camera capturing video of the user in the video conference. The drag input may comprise, for example, mouse or touch movements, clicks, keyboard inputs, taps, swipes, gestures, voice commands, activation of interface controls, and other user inputs. In some embodiments, after the user has grabbed the active pane in step 212, then further movements of the mouse or touch input on the screen move the active pane to the new location of the mouse or touch input. When the user lifts up the left mouse button or his or her finger from the touch screen, then the active pane is dropped at its current location on the screen and remains at that location until it is moved again.

At step 216, the system 100 displays the active pane on the screen at the new location near the camera capturing video of the user in the video conference. When the user views the active pane, the video of the user that is presented to other participants may appear to show the user making eye contact because the user is looking more in the direction of the camera than in other view layouts.

Figure 3A:
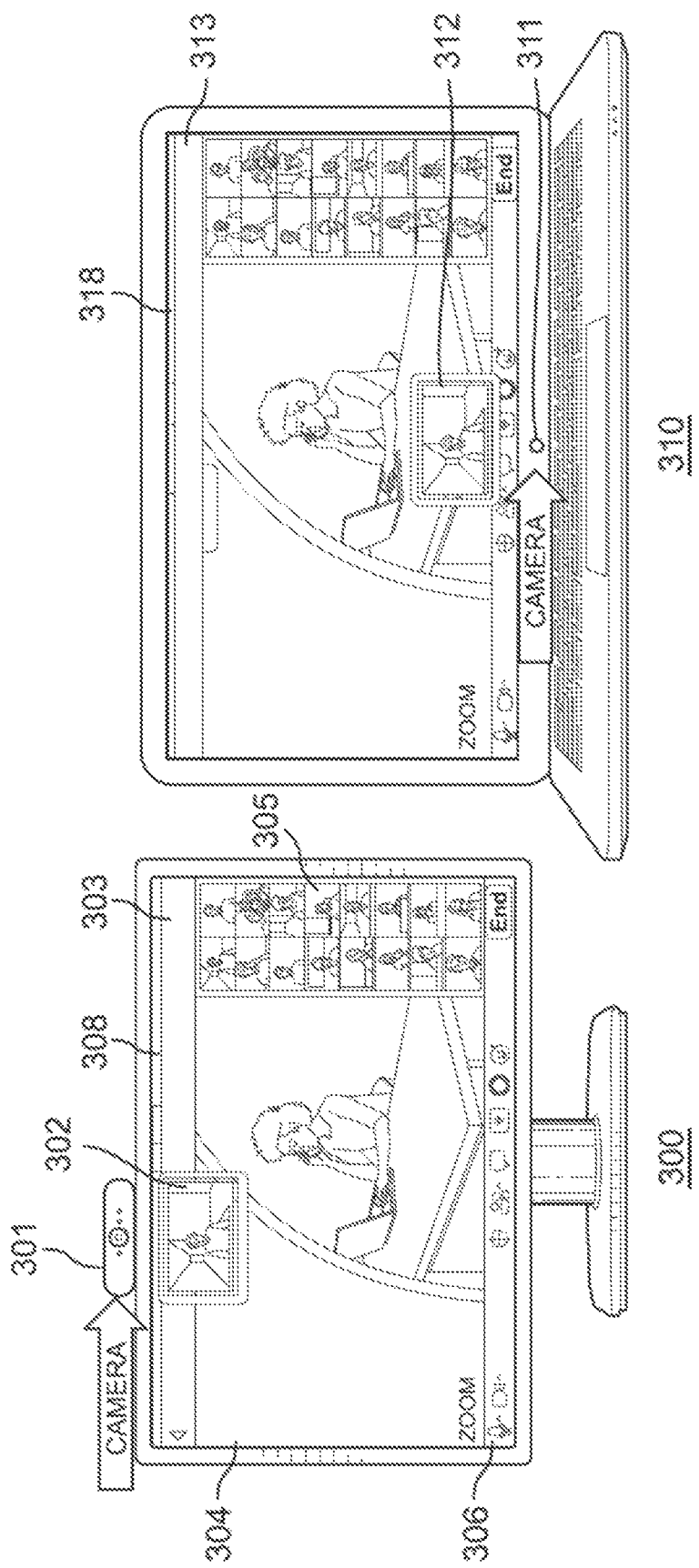
FIG. 3A illustrates an example user interface according to one embodiment of the present disclosure.

FIG. 3A illustrates example user interface 300 and example user interface 310 according to embodiments of the present disclosure. The User Interface module 152 of system 100 may generate and display a user interface 300, 310. The View Settings module 154 may access view settings repository 134 to determine the current view layout of the user. Based on accessing the view settings repository 134, the system 100 may determine that the user's current view layout is the active pane view. System 100 may load layout data from the view layouts repository 132 for displaying the active pane view. System 100 displays the active pane view on screen 308, 318 including an active pane 302, 312.

User interface 300 is displayed on screen 308, which is part of an external computer monitor. Camera 301 is removably attached to the computer monitor and captures video of the user for display to other video conference participants in the video conference. User interface 300 displays an active pane view including an active pane 302. The active pane 302 is displayed near the camera 301 to enhance the appearance of eye contact by the user. Screen coordinates of the active pane 302 are near the physical location of camera 301. Active pane 302 may be positioned near the camera 301 via methods 200, 500, 600, 700, or other methods herein.

In this example, the active pane 302 displays a video conference participant, though active pane 302 may display video of the user or other users, shared content (such as a shared screen, document, or other content), an indicator or display for the user to look at, or any other content. User interface 300 displays active pane 302 on top of view 303, where view 303 is a view of video communication platform 140. View 303 includes a main content pane 304, thumbnails gallery 305, and a control bar 306. The main content pane 304 displays shared content, which in this example comprises a presentation. In some embodiments, the main content pane 304 may display other content such as video of the user or other users, other shared content (such as a shared screen, document, or other content), or any other content. Thumbnails gallery 305 displays thumbnail videos of video conference participants. In some embodiments, the thumbnails gallery 305 includes the video of the user shown in active pane 302 as shown in user interface 300, which may be useful if, for example, the active pane 302 switches between displaying video conference participants based on which video conference participant is speaking. Control bar 306 includes user controls for the video communication platform 140, such as a mute button, a toggle camera on/off button, a security settings button, a participants list button, a chat button, a share content button, a record button, a reactions button, an end conference button, and other user controls. View menu for selecting the view layout may be located in the control bar 306 or elsewhere in the user interface 300.

View 303 comprises content shown behind the active pane 302, and it is not restricted to showing just main content pane 304, a thumbnails gallery 305, and control bar 306. View 303 may show any type of content. In some embodiments, view 303 may comprise a speaker view, a gallery view, or an immersive view. The speaker view, gallery view, or immersive view may be displayed behind the active pane. The speaker view, gallery view, or immersive view may be displayed in full screen mode or may be displayed in a window on the screen 308. In some embodiments, view 303 behind the active pane 302 is not part of the video communication platform 140. For example, in one mode, the only display of video communication platform 140 on screen 308 is the active pane 302 and optional controls associated with the active pane 302. View 303 behind the active pane 302 may comprise a home screen or full screen or windowed displays of one or more other applications on the user's client device. For example, active pane 302 is displayed on top of displayed content from other applications or the operating system of the client device.

User interface 310 shows another example of active pane view with active pane 312. User interface 310 is displayed on screen 318, which is part of a laptop computer. Camera 311 is built into the lid of the laptop computer below the screen 318 and captures video of the user for display to other video conference participants in the video conference. User interface 310 displays an active pane view including an active pane 312. The active pane 312 is displayed near the camera 311 to enhance the appearance of eye contact by the user. Active pane 312 may be positioned near the camera 311 via methods 200, 500, 600, 700, or other methods herein. View 313 behind the active pane 312 may comprise any content, such as a speaker view, gallery view, or immersive view, or content that is not part of the video communication platform 140, such as a home screen or full screen or windowed displays of one or more other applications on the user's client device.

Figure 3B:
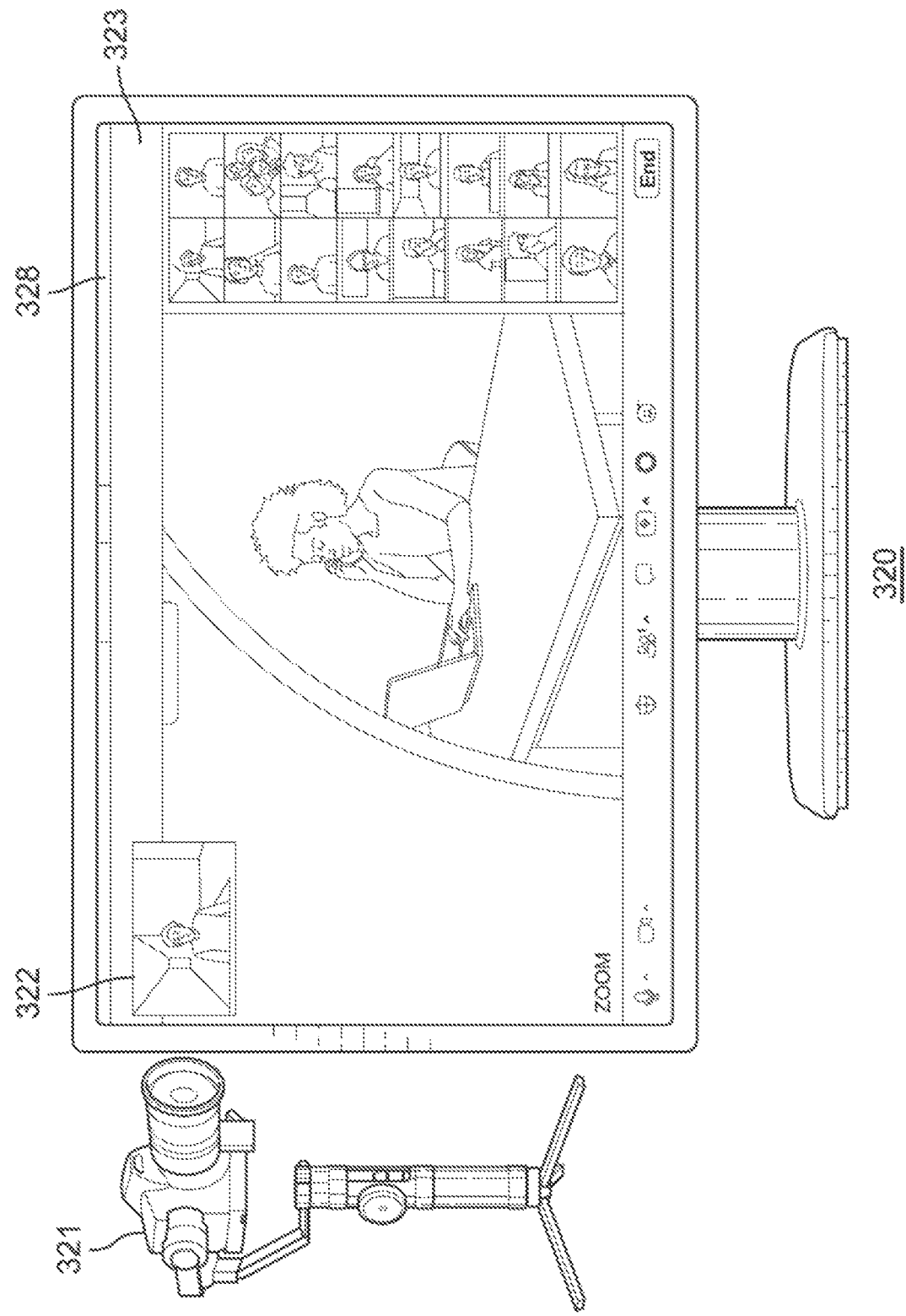
FIG. 3B illustrates an example user interface according to one embodiment of the present disclosure.

FIG. 3B illustrates an example user interface 320 according to an embodiment of the present disclosure. User interface 320 shows another example of active pane view with active pane 322. User interface 320 is displayed on screen 328, which is part of an external computer monitor. Camera 321 is mounted on a stand to the side of the computer monitor and captures video of the user for display to other video conference participants in the video conference. User interface 320 displays an active pane view including an active pane 322. The active pane 322 is displayed near the camera 321 to enhance the appearance of eye contact by the user. Active pane 322 may be positioned near the camera 321 via methods 200, 500, 600, 700, or other methods herein. View 323 behind the active pane 322 may comprise any content, such as a speaker view, gallery view, or immersive view, or content that is not part of the video communication platform 140, such as a home screen or full screen or windowed displays of one or more other applications on the user's client device.

Figure 3C:
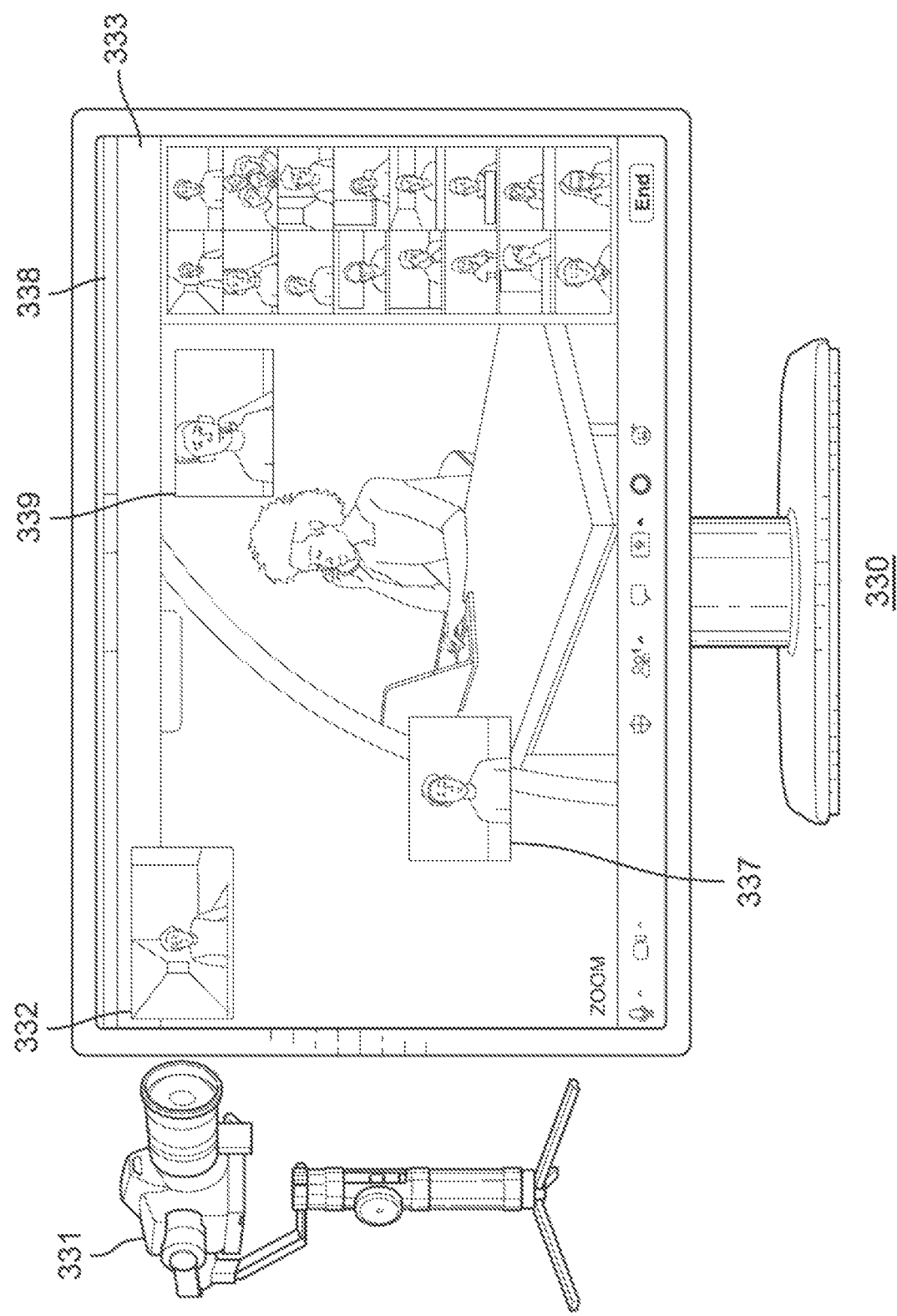
FIG. 3C illustrates an example user interface according to one embodiment of the present disclosure.

FIG. 3C illustrates an example user interface 330 according to an embodiment of the present disclosure. User interface 330 on screen 338 shows an active pane view with multiple active panes 332, 337, 339. Active pane 332 is displayed near the camera 331 that is capturing video of the user for display to other video conference participants, and active panes 337, 339 are not near the camera 331. View 333 corresponds to and may include the same functionality as view 303. Active panes 332, 337, 339 may each be positioned via methods 200, 500, 600, 700, or other methods herein.

In some embodiments, each active pane 332, 337, 339 is movable by the user by any form of user input, such as clicking or tapping to drag the active pane. For example, the user may drag active panes 337, 339 to also be near camera 331. In some embodiments, user interface 330 may simulate the appearance of being in a real-world face-to-face interaction because when the user looks at the participant in active pane 332 the user may appear to be making eye contact with the participants in the video conference, but when the user looks at either participant in active panes 337, 339 then the user may appear to be looking away and not be making eye contact with the participants in the video conference. This user interface 330 may simulate the appearance of the user looking at different participants in a real-world room, where the user may sometimes be making eye contact but sometimes be looking at other participants.

In some embodiments, user interface 330 may switch the location of active panes based on which video conference participant is speaking. User interface 330 may move an active pane with a participant that is speaking near the camera and move an active pane with a participant that is not speaking away from the camera. For example, active pane 332 near the camera 331 may switch positions with one of the other active panes 337, 339 when the video conference participant displayed in active pane 332 stops speaking and one of the video conference participants in active panes 337, 339 starts speaking. The active pane with the video conference participant that is speaking is moved to the location of active pane 332 near the camera 331, and active pane 332 is moved away, such as to the prior position of the active pane with the speaking participant. User interface 330 may display a plurality of active panes, including a first active pane displaying a first video conference participant and a second active pane displaying a second video conference participant, the first active pane displayed on the screen near the camera, the second active pane displayed on the screen not near the camera. The user interface 330 may switch the location of the first active pane and the second active pane when the first video conference participant stops speaking and the second video conference participant starts speaking.

Figure 3D:
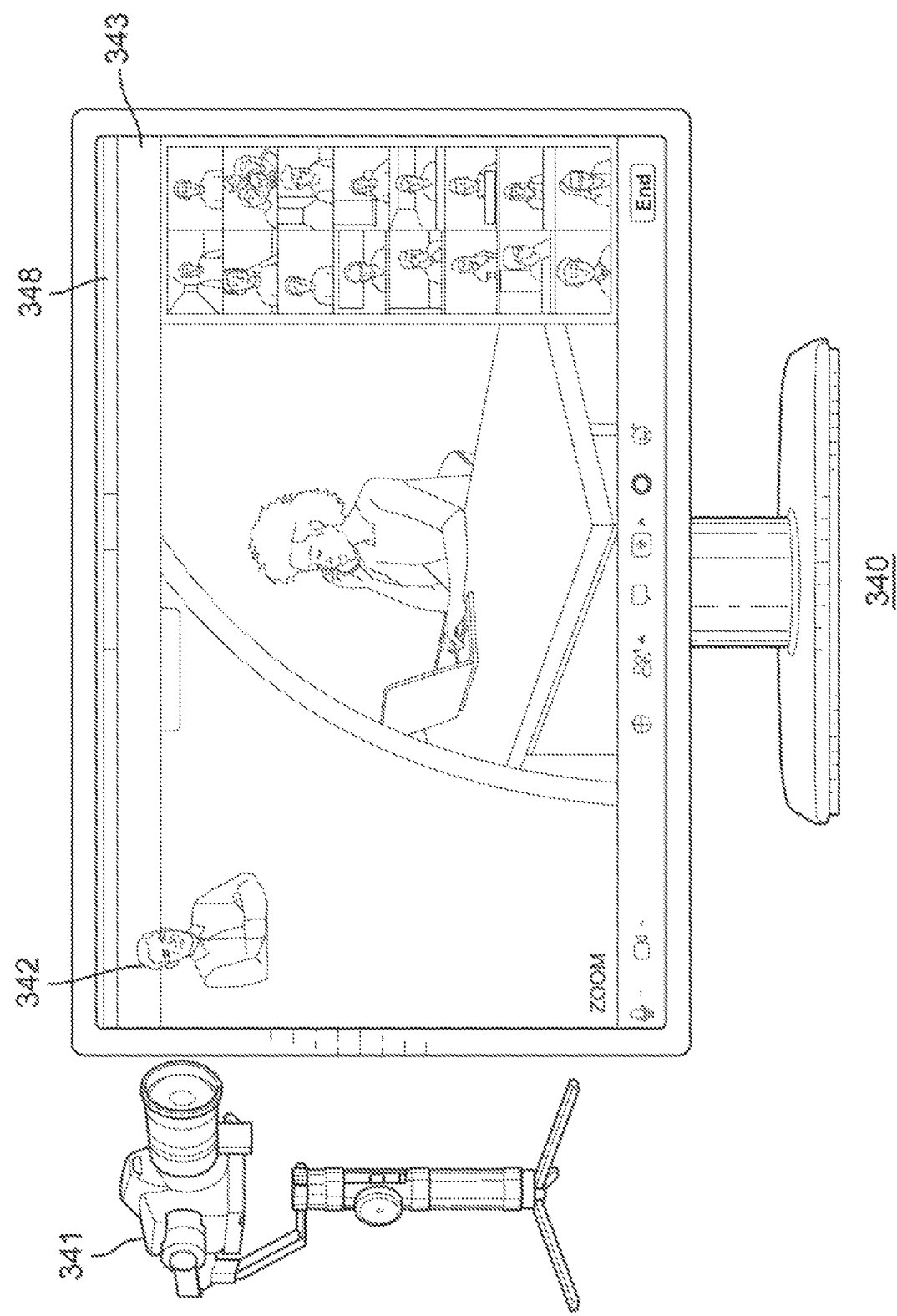
FIG. 3D illustrates an example user interface according to one embodiment of the present disclosure.

FIG. 3D illustrates an example user interface 340 according to an embodiment of the present disclosure. User interface 340 on screen 348 shows an active pane view with active pane 342. Active pane 342 is displayed near the camera 331 that is capturing video of the user for display to other video conference participants. Active pane 342 displays video of the video conference participant, but not the video of the participant's background. When the video of the video conference participant is captured, system 100 determines a boundary about the video conference participant, wherein the boundary has an interior portion and an exterior portion. The system 100 generates a filtered video depicting the interior portion depicting imagery of the video conference participant overlaid on a transparent background. As a result, the system 100 removes the background from the video conference participant's video. Active pane 342 is displayed with a transparent background so that the video conference participant in active pane 342 is displayed on top of view 343 without the occlusion from the video conference participant's background. View 343 corresponds to and may include the same functionality as view 303. Active pane 343 may be positioned via methods 200, 500, 600, 700, or other methods herein.

Figure 3E:
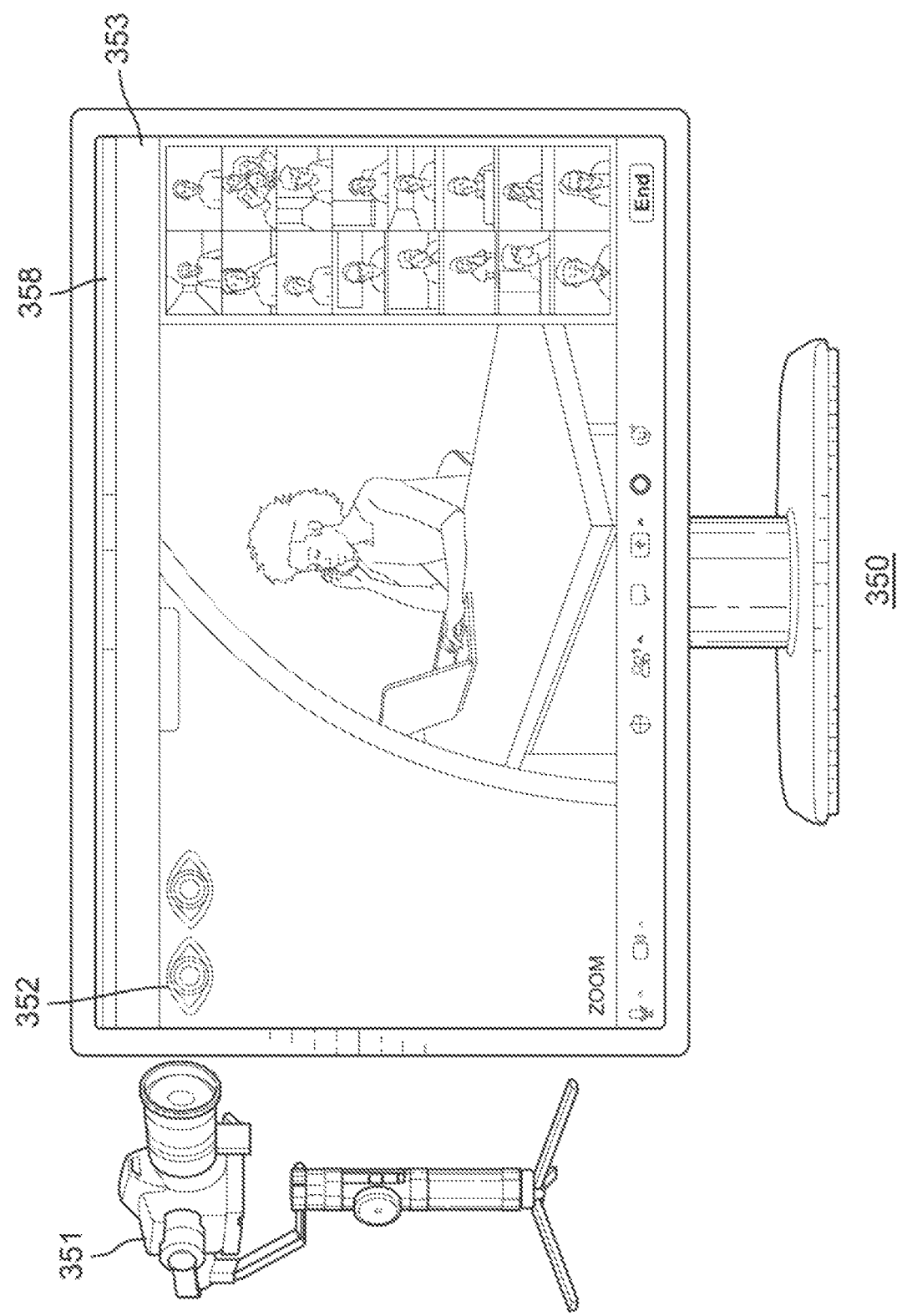
FIG. 3E illustrates an example user interface according to one embodiment of the present disclosure.

FIG. 3E illustrates an example user interface 350 according to an embodiment of the present disclosure. User interface 350 on screen 358 shows an active pane view with active pane 352. Active pane 352 is displayed near the camera 351 that is capturing video of the user for display to other video conference participants. Active pane 352 displays an indicator for the user to look at active pane 352. In this example, active pane 352 displays a pair of eyes, but any indicator may be used. For example, indicator may comprise a graphical indicator or icon, a text notification (e.g., "Look Here") such as in a pane or window, an image or video, or other indicator. One advantageous application of the indicator can be when the user is giving a presentation to other video conference participants. The presenter may not have a need to view other video participants, and it may be more effective in attracting the user's eyes to include an indicator rather than video of other participants in the active pane 352. In one embodiment, the active pane 352 may display a view of the user's presentation (or other shared content), such as a slide deck, so that as the user looks at the presentation the user appears to be making eye contact with the other video conference participants. View 353 corresponds to and may include the same functionality as view 303. Active pane 352 may each be positioned via methods 200, 500, 600, 700, or other methods herein.

Participant Video Display on Transparent or Translucent Background

Figure 4:
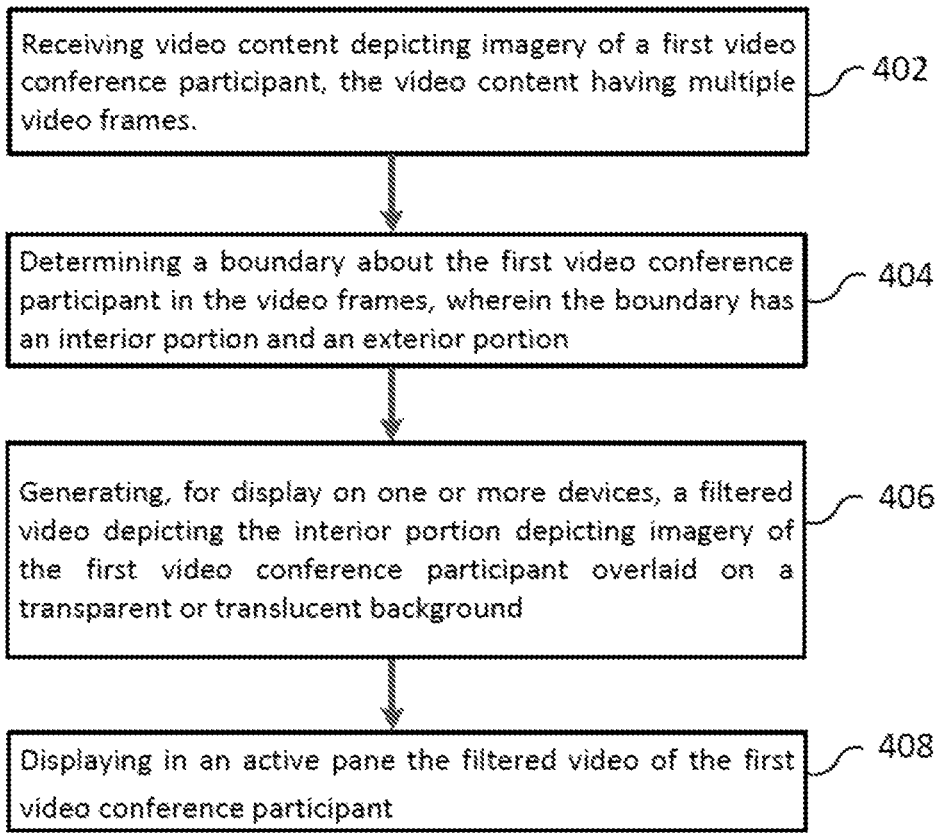
FIG. 4 is a flow chart illustrating an exemplary method that may be performed in some embodiments.

FIG. 4 is a flow chart illustrating an exemplary method 400 that may be performed in some embodiments. In some embodiments, the system 100 provides for determining a boundary between a video conference participant in a video and the background. The system 100 retains the portion of the video depicting the participant and removes the portion of the video depicting the background. The system 100 may replace the background with a transparent or translucent background and displays the video of the participant in an active pane to display the participant near the camera while minimizing occlusion of content in view 303 behind the active pane.

At step 402, the system 100 receives video content depicting imagery of a first video conference participant, the video content having multiple video frames. In some embodiments, the video content is captured by a video camera attached or connected to the first video conference participant's client device. The video content may be received at the client device, the video communication platform 140, and/or processing engine 102.

At step 404, the system 100 determines a boundary about the first video conference participant in the video frames, wherein the boundary has an interior portion and an exterior portion. In some embodiments, the interior portion contains the first video conference participant, including their face and body, and the exterior portion contains all other content of the video frames, including foreground and background environment. The system 100 may perform image processing to determine a boundary between the first video conference participant and the environment in the video frames. In some embodiments, the image processing comprises edge detection, image segmentation, image matting, other image processing techniques, or a combination of techniques. Image processing may include artificial intelligence and/or machine learning. The boundary may change in each video frame, for example, as the first video conference participant moves in the video content. The system 100 processing to determine the boundary may be performed at the client device, the video communication platform 140, and/or processing engine 102.

At step 406, the system 100 generates, for display on one or more devices, a filtered video depicting the interior portion depicting imagery of the first video conference participant overlaid on a transparent or translucent background. In some embodiments, the Video Processing module 162 adjusts the opacity of the exterior portion of the video frames containing the environment to make the pixels of the exterior portion transparent or translucent. In some embodiments, the Video Processing module 162 composites the interior portion containing imagery of the first video conference participant with a transparent or translucent background that replaces the exterior portion of the video frames containing the environment. As a result, the system 100 may remove from display the exterior portion of the video frames containing the environment.

At step 408, the system 100 displays in an active pane the filtered video of the first video conference participant. In some embodiments, the system 100 displays the active pane containing the filtered video of the first video conference participant on the screens of other video conference participants' client devices near the cameras of said client devices. Because the filtered video comprises a transparent or translucent background, the view 303 behind the active pane is visible through the transparent or translucent background on the other video conference participants' client devices, which reduces occlusion.

In some embodiments, the opacity of the transparent or translucent background of the filtered video is adjustable by the user. For example, the opacity may be set on a scale from 0% to 100% corresponding to fully transparent to fully opaque, respectively. In some embodiments, system 100 displays an opacity control setting for adjusting the opacity of the background on which the first video conference participant is overlaid in the filtered video. System 100 receives an input opacity via the opacity control setting and adjusts the opacity of the background on which the first video conference participant is overlaid in the filtered video according to the input opacity. The opacity control setting may comprise a slider, menu, button, or other user interface controls. In some embodiments, the interior and exterior portions of the video frames comprise one or more pixels, and the system 100 adjusts the opacity of the exterior portion by adjusting the alpha values of the pixels of the exterior portion, where a minimum alpha value (e.g., 0) corresponds to fully transparent and a maximum alpha value corresponds to fully opaque.

Active Pane Placement

Active pane may be displayed on the screen at a location set manually by the user or at a location that is automatically set by a computer system. In some embodiments, system 100 includes a default location where active pane is displayed on the first display of the active pane in active pane view. In some embodiments, the last location (e.g., most recent) of the active pane is stored in user account repository 130 or elsewhere on first user's client device 150, additional users' client devices 160, video communication platform 140, or processing engine 102 for the active pane to be displayed at that last location when the video communication platform 140 is next used. System 100 retrieves the last location from the user account repository 130 or other database/repository and displays the active pane at the last location. By displaying active pane at the last location, the display location of active pane may be consistent between uses of the video communication platform 140.

Figure 5:
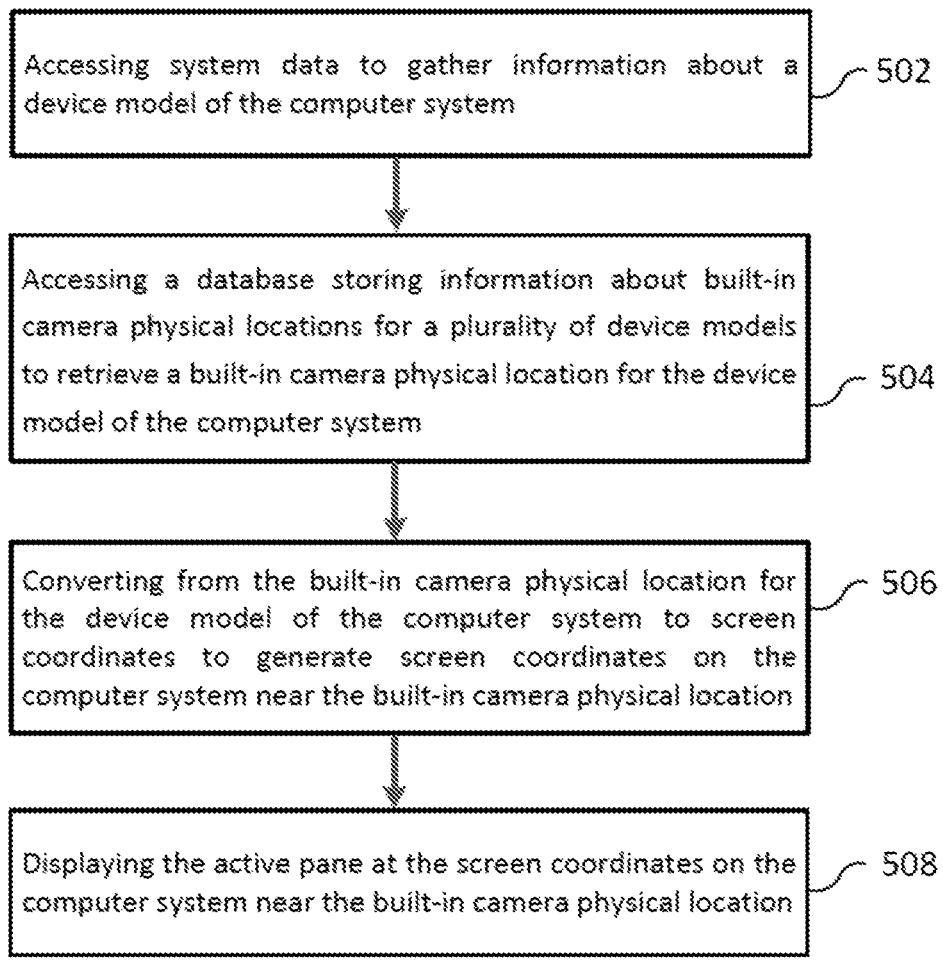
FIG. 5 is a flow chart illustrating an exemplary method that may be performed in some embodiments.

FIG. 5 is a flow chart illustrating an exemplary method 500 that may be performed in some embodiments. In some embodiments, the system 100 provides for determining the location on a screen for displaying the active pane automatically. System 100 may retrieve information from a database about the computer model of the user's client device to determine the location of the camera on the client device. The system 100 may display the active pane near the camera based on the retrieved location. In some embodiments, method 500 may be used to determine an initial display location of the active pane prior to the active pane being moved to a new location by a user via method 200 or other methods herein.

At step 502, the system 100 accesses system data to gather information about a device model of a computer system. In some embodiments, first user's client device 150 or additional users' client devices 160 perform step 502 to access system data on the client device to retrieve a device model of the client device. The device model may comprise an identifier, a code, a text string, or any identifier of a device model.

At step 504, the system 100 accesses a database storing information about built-in camera physical locations for a plurality of device models to retrieve a built-in camera physical location for the device model of the computer system. In some embodiments, the database comprises camera locations repository 136, which may be an internal database and/or repository of video communications platform 140 or an external or third-party database and/or repository. In some embodiments, the camera locations repository 136 comprises a plurality of databases and/or repositories. In some embodiments, the camera locations repository 136 stores for each of a plurality of device models a built-in camera physical location for the device model indicating where the built-in camera is physically located on the device model. For example, the built-in camera physical location may identify whether the camera is above or below the screen, centered or offset to one side, and so on, for a computer model. In some embodiments, camera locations repository 136 does not include device models that do not have a built-in camera. System 100 queries the camera locations repository 136 based on the device model of the user's client device and retrieves the built-in camera physical location for the device model.

At step 506, system 100 converts from the built-in camera physical location for the device model of the computer system to screen coordinates to generate screen coordinates on the computer system near the built-in camera physical location. In some embodiments, system 100 accesses system data to determine the screen resolution on the computer system. In some embodiments, the built-in camera physical location may comprise proportions based on the physical screen size. The proportions may identify the built-in camera physical location in units of fractions of screen width and height, such as above the screen (e.g., 100% of screen height) and at the horizontal midpoint (e.g., 50% of screen width). In some embodiments, the built-in camera physical location may comprise physical measurement data, in units of physical measurement, such as above the screen and 10 inches from the left. System 100 may convert the physical measurement data into proportions based on the physical screen size such as above the screen and 37% of screen width from the left. System 100 may generate screen coordinates based on the screen resolution and the built-in camera physical location by applying the proportions of physical screen size identifying the built-in camera physical location to the screen resolution. For example, when the built-in-camera physical location is above the screen (e.g., 100% of screen height), then system 100 may generate screen coordinates with y coordinates near the top of the screen, and, when the built-in-camera physical location is 37% of screen width from the left, then system 100 may generate screen coordinates with x coordinates that are 37% of the screen resolution (e.g., measured in pixels) from the left of the screen.

At step 508, system 100 displays the active pane at the screen coordinates on the computer system near the built-in camera physical location.

Figure 6:
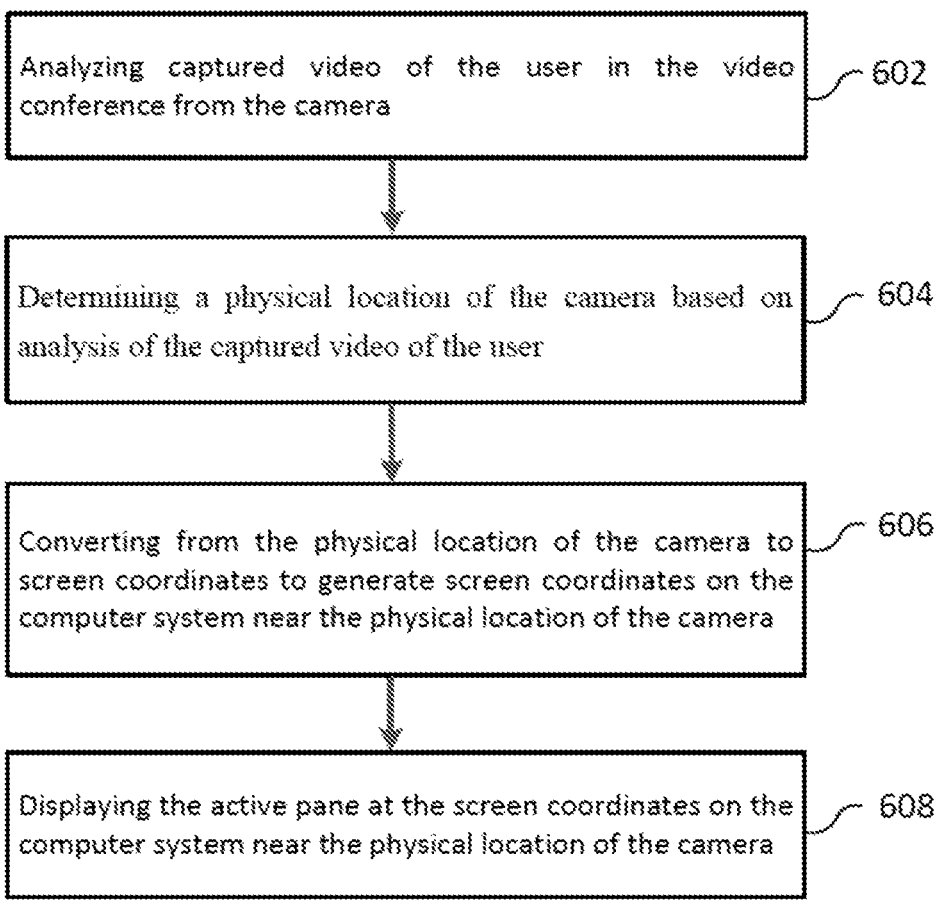
FIG. 6 is a flow chart illustrating an exemplary method that may be performed in some embodiments.

FIG. 6 is a flow chart illustrating an exemplary method 600 that may be performed in some embodiments. In some embodiments, the system 100 provides for determining the location on a screen for displaying the active pane automatically. System 100 may analyze video captured from a camera to determination the location of the camera relative to the screen of the client device. The system 100 may display the active pane near the camera based on the retrieved location. In some embodiments, method 600 may be used to determine an initial display location of the active pane prior to the active pane being moved to a new location by a user via method 200 or other methods herein.

At step 602, system 100 analyzes captured video of the user in the video conference from the camera. In some embodiments, system uses artificial intelligence or machine learning to analyze the captured video. In some embodiments, system 100 analyzes the video to detect one or more perspective lines in the captured video. Perspective lines may comprise one or more lines in video, video frames, or images from which the location or orientation of the camera may be determined. In some embodiments, perspective lines converge to the horizon or run substantially parallel to an expected horizon. System 100 may detect perspective lines using edge detection, object detection, image segmentation, image matting, or other image processing techniques.

In some embodiments, system 100 analyzes the video to detect a landmark in the captured video. A landmark may comprise a feature in the captured video for which the system 100 has stored or may retrieve a physical location (e.g., physical coordinates). For example, a landmark may comprise an object, such as a table, a painting, a wall, and so on, or a feature, such as a unique marking on a wall, a QR code, and so on.

The system 100 processing to analyze the captured video may be performed at the client device, the video communication platform 140, and/or processing engine 102.

At step 604, system 100 determines a physical location of the camera based on analysis of the captured video of the user. In some embodiments, system uses artificial intelligence or machine learning to determine the physical location of the camera. In some embodiments, system 100 determines the physical location of the camera based on one or more perspective lines detected in the video. In some embodiments, system 100 may comprise a model expected environment of a user, which may include a desk, chair, and other office or home furniture. In an exemplary model expected environment, a screen and a camera are aligned with the desk, chair, and other furniture so that perspective lines (e.g., the side edges of the table and chair) converge to expected vanishing point locations in the captured video and horizontal perspective lines (e.g., the front edge of the desk) have an expected horizontal orientation in the video. System 100 may compare the perspective lines detected in the video with expected perspective lines of a model expected environment of a user and determine a difference between the detected perspective lines and the expected perspective lines. Based on this difference, the system 100 determines the difference in orientation between the physical location of the camera and the camera orientation in a model expected environment, and the system 100 determines the physical location of the camera. For example, based on this difference, system 100 may determine that the camera is located to the side, above, or below the screen and the angle of the camera with respect to the screen and the user who is in front of the screen.

In some embodiments, system 100 determines the physical location of the camera based on a landmark in the video. System 100 retrieves the location of the landmark in the video, such as from storage or a database. System 100 performs image processing to determine the location of the camera relative to the landmark based on the size, shape, and scale of the landmark. System 100 combines the location of the landmark with the location of the camera relative to the landmark to determine the physical location of the camera.

The system 100 processing to determine the physical location of the camera may be performed at the client device, the video communication platform 140, and/or processing engine 102.

At step 606, system 100 converts from the physical location of the camera to screen coordinates to generate screen coordinates on the computer system near the physical location of the camera. In some embodiments, the physical location of the camera may comprise proportions based on the physical screen size. The proportions may identify the camera physical location in units of fractions of screen width and height. Step 606 may use the same methods and functionality as step 506.

At step 608, system 100 displays the active pane at the screen coordinates on the computer system near the physical location of the camera.

Figure 7:
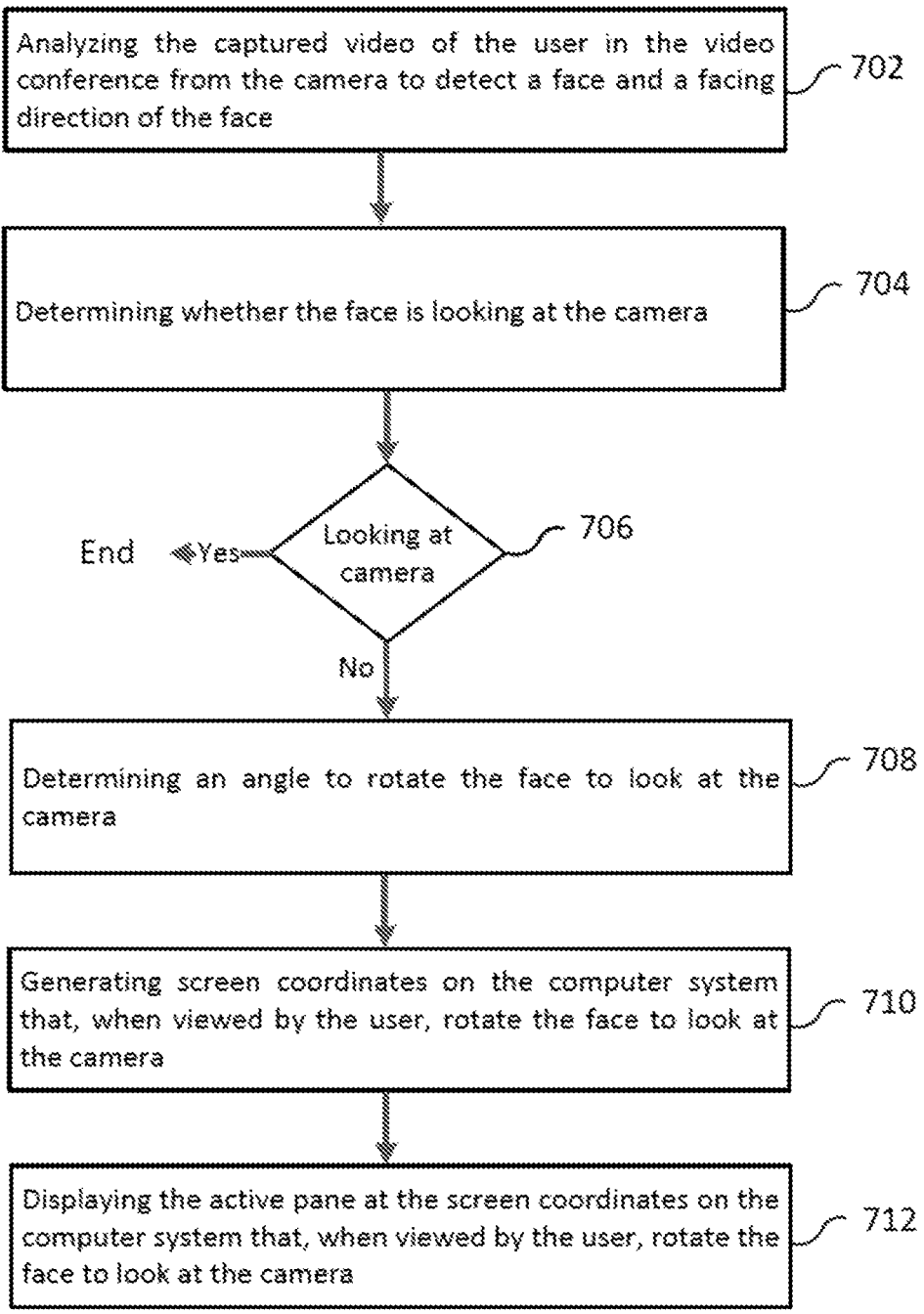
FIG. 7 is a flow chart illustrating an exemplary method that may be performed in some embodiments.

FIG. 7 is a flow chart illustrating an exemplary method 700 that may be performed in some embodiments. In some embodiments, the system 100 provides for determining the location for displaying the active pane automatically. System 100 may analyze video captured from a camera to detect a face and the facing direction of the face. The system 100 may determine a screen location to display the active pane to rotate the face to look in the direction of the camera. In some embodiments, method 700 may be used to determine an initial display location of the active pane prior to the active pane being moved to a new location by a user via method 200 or other methods herein.

At step 702, system 100 analyzes the captured video of the user in the video conference from the camera to detect a face and a facing direction of the face. In some embodiments, system 100 performs a face detection algorithm, which may comprise artificial intelligence or machine learning and which detects a face and determines a facing direction of the face relative to the camera. For example, when system 100 detects the left side of a user's face in the video, the user may be facing to the right of the camera, and vice versa. System 100 may detect based on the size, shape, and scale of the user's forehead, nose, eyes, mouth, and other features that the user's face is facing below the camera. System 100 may detect based on the size, shape, and scale of the user's chin, nostrils, nose, eyes, mouth, and other features that the user's face is facing above the camera. The system 100 processing to analyze the captured video may be performed at the client device, the video communication platform 140, and/or processing engine 102.

At step 704, system 100 determines whether the face is looking at the camera. System 100 may determine whether the face is looking at the camera based on the facing direction determined in step 702.

At step 706, when user is looking at the camera, then method 700 may end because the user is making eye contact with the camera and content on the screen does not need to be moved. When the user is not looking at the camera, then method 700 continues at step 708.

At step 708, system 100 determines an angle to rotate the face to look at the camera. In some embodiments, system determines the angle to rotate the face using artificial intelligence or machine learning. In some embodiments, the system 100 determines an angle of the face relative to the camera in step 702, which specifies the facing direction of the face. In some embodiments, the angle of the face relative to the camera determines the angle to rotate the face to look at the camera. For example, system 100 may negate (e.g., take additive inverse of) the angle of the face relative to the camera to generate the angle to rotate the face to look at the camera.

At step 710, system 100 generates screen coordinates on the computer system that, when viewed by the user, rotate the face to look at the camera. In some embodiments, system 100 generates the screen coordinates by assuming that the facing direction of the face in the video is determined by the user looking at the active pane or other content on the screen. System 100 determines the location in screen coordinates of the active pane or other content that user is most likely viewing. System 100 generates screen coordinates that, when viewed, rotate the face to look at the camera based on the screen coordinates of the active pane or other content that the user is most likely viewing and the angle to rotate the face to look at the camera. For example, system 100 may compute the physical distance needed to move the active pane or content so that the face will rotate to look at the camera, convert the physical distance into a distance in pixels based on the screen resolution, and combine (e.g., add or subtract) the distance in pixels with the screen coordinates of the active pane or other content that the user is most likely viewing to generate the new screen coordinates.

At step 712, system 100 displays the active pane at the screen coordinates on the computer system that, when viewed by the user, rotate the face to look at the camera.

Enabling/Disabling Active Pane View

In some embodiments, system 100 includes user controls for selecting the view layout for display to the user. In some embodiments, in response to the user selecting the active pane view, the active pane view is displayed to the user, and each user may select his or her own view layout. The view layout on first user's client device 150 and additional users' client devices 160 is determined in response to a user selection of the view layout on the client device. In some embodiments, system 100 includes user controls for selecting the view layout for display to the user and to all or a portion of video conference participants in the video conference. In some embodiments, in response to the user selecting the active pane view, the active pane view is displayed to all or a portion of video conference participants in the video conference. The view layout on first user's client device 150 and additional users' client devices 160 is determined in response to a user selection of the view layout by a single user, such as a host, on a client device. For example, when the user is a presenter, it may be desirable for the user to be able to select the active pane view for all or a portion of video conference participants for the participants to appear to be making eye contact with the presenter.

Figure 8:
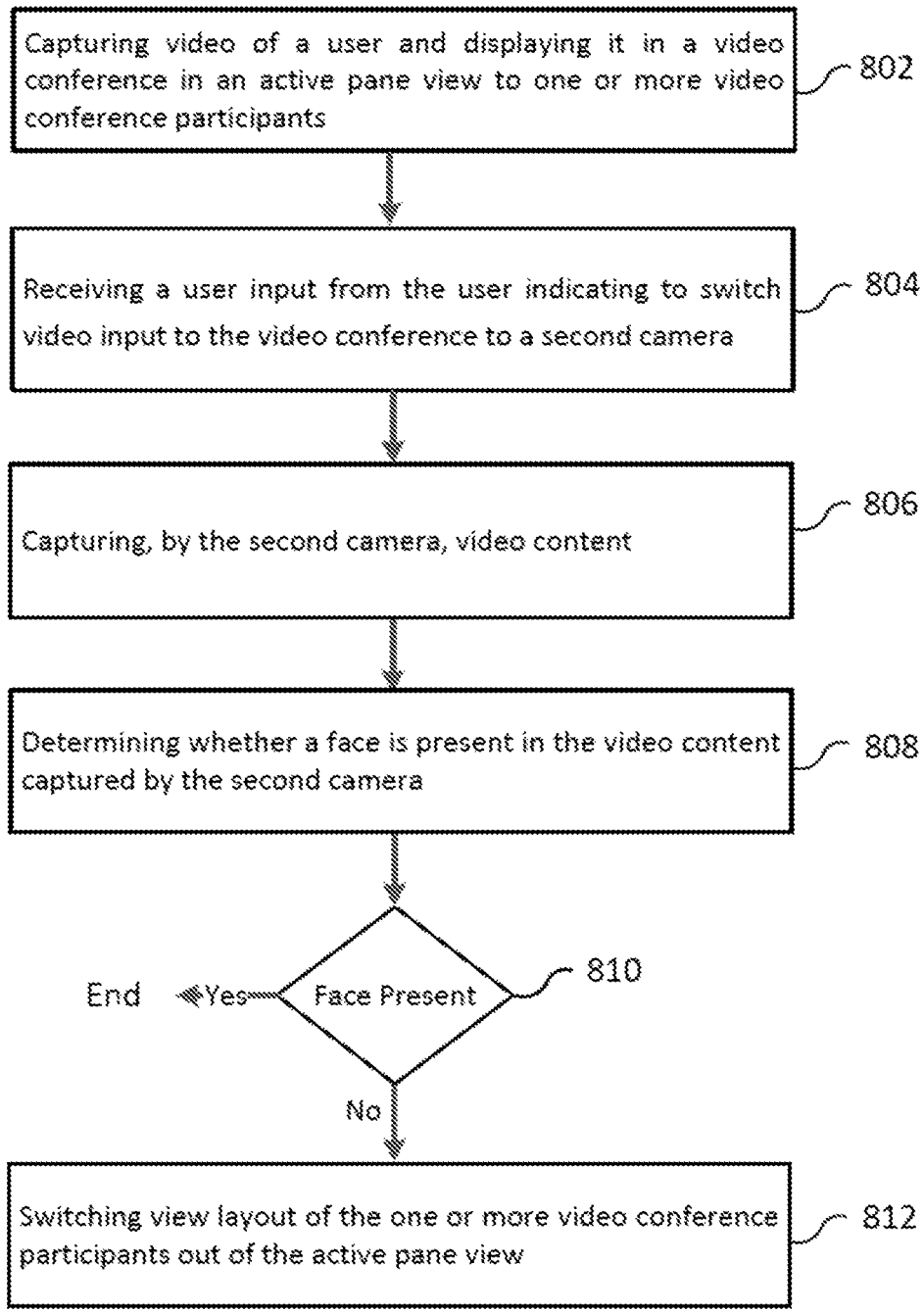
FIG. 8 is a flow chart illustrating an exemplary method that may be performed in some embodiments.

FIG. 8 is a flow chart illustrating an exemplary method 800 that may be performed in some embodiments. In some embodiments, the system 100 provides for enabling or disabling active pane view for one or more video conference participants automatically. System 100 may automatically disable active pane view when no face is detected in video content. For example, method 800 may be advantageous when a presenter switches video feeds in video communication platform 140 from a camera capturing video of himself or herself to a document camera.

At step 802, system 100 captures video of a user and displays it in a video conference in an active pane view to one or more video conference participants. In some embodiments, the video is captured by a camera aimed to captured video of the user's face.

At step 804, system 100 receives a user input from the user indicating to switch video input to the video conference to a second camera. In some embodiments, system 100 provides one or more user controls for allowing the user to select between one or more cameras connected to a client device. In response to user input, system 100 may switch the video input streamed from the user's client device to a different camera.

At step 806, system 100 captures, by the second camera, video content. For example, the second camera may capture content such as a document, a blackboard/whiteboard, an environment, and so on.

At step 808, system 100 determines whether a face is present in the video content captured by the second camera. For example, when the second camera is capturing a document, a blackboard/whiteboard, or an environment without people, then a face may not be present. In some embodiments, system 100 performs a face detection algorithm, which detects when a face is present in the video content.

At step 810, when a face is present in the video content captured by the second camera, then method 800 may end because a face is detected in the video content. When a face is not present in the video content captured by the second camera, then method 800 continues at step 812.

At step 812, system 100 switches a view layout of the one or more video conference participants out of the active pane view. In some embodiments, system 100 switches the view layout of the one or more video conference participants to a speaker view, gallery view, or immersive view. In some embodiments, method 800 is advantageous because when the user is presenting to video conference participants and changes his or her video input from a video capture of the user to a video capture of content, then eye contact from the video conference participants may be of lesser importance given that the user may expect the participants to be looking at the content and not making eye contact with the user.

Eye Contact Notification and Use Cases

In some embodiments, Computer Vision module 158 analyzes video of a video conference participant to determine whether the participant is making eye contact with the camera. Computer Vision module 158 may analyze the video to detect a face and eyes of the face to determine whether the eyes are looking at the camera, such as by using artificial intelligence or machine learning. In some embodiments, system 100 displays a notification to a user about whether one or more video conference participants in a video conference are making eye contact or not, as determined by the Computer Vision module 158. In some embodiments, system 100 displays a notification when one or more video conference participants are determined to be making eye contact, are determined to not be making eye contact, or the status of eye contact of the video conference participants changes (e.g., change from eye contact to no eye contact, or vice versa). In some embodiments, system 100 displays a notification to a presenter in a video conference about the eye contact of one or more video conference participants watching the presentation (e.g., a teacher monitoring the eye contact of students). In some embodiments, system 100 displays a notification to one or more video conference participants about the eye contact of a presenter in the video conference (e.g., students monitoring whether the teacher is watching them). In some embodiments, notifications may comprise graphical or textual indicators, pop ups, windows or panes, changing display elements (e.g., blinking), or other indicators.

In some embodiments, system 100 may monitor and determine whether one or more video conference participants have the active pane near the camera of the participants' client devices. System 100 may determine the location of the camera on one or more participants' client devices using methods 500, 600, 700, or other methods herein. System 100 may compare the location of the active pane on the participants' client devices to the location of the camera and display a notification if the active pane is more than a threshold distance from the location of the camera. System 100 may display the notification to the user of the client device or to one or more other video conference participants. For example, in some embodiments, system 100 may display the notification to a presenter when one of the participants has an active pane that is too far from the camera, so that the presenter can assist the participant in configuring his or her active pane to be near the camera.

In some embodiments, system 100 may be used by a presenter to present shared content to one or more video conference participants. In one use case, the view layout of the presenter may be an immersive view to display all of the video conference participants to the presenter. In some embodiments, the view layout of the presenter may be an active pane view with view 303 behind the active pane comprising an immersive view. In this view layout, the active pane may display the presentation in the active pane to enable the presenter to view and control the presentation during the video conference, while also viewing all of the video conference participants in the immersive view behind the active pane. In some embodiments, the view layout of the video conference participants may be an active pane view, where the active pane displays the video of the presenter captured from the camera of the presenter's client device. In addition, in the view layout of the video conference participants, the view 303 behind the active pane may comprise a shared content view displaying a main pane with the presentation. Alternatively, the view 303 behind the active pane may comprise an immersive view displaying all of the video conference participants. In these view layouts, the video conference participants may view the video of the presenter in the active pane and also the content, or alternatively the other video conference participants, behind the active pane. These use cases may simulate for the presenter and video conference participants the experience of a real-world presentation with similar amounts of eye contact. For example, the presenter may experience eye contact from the video conference participants in the immersive view when the video conference participants view the video of the presenter in the active panes displayed on their client devices.

Exemplary Computer System

Figure 9:
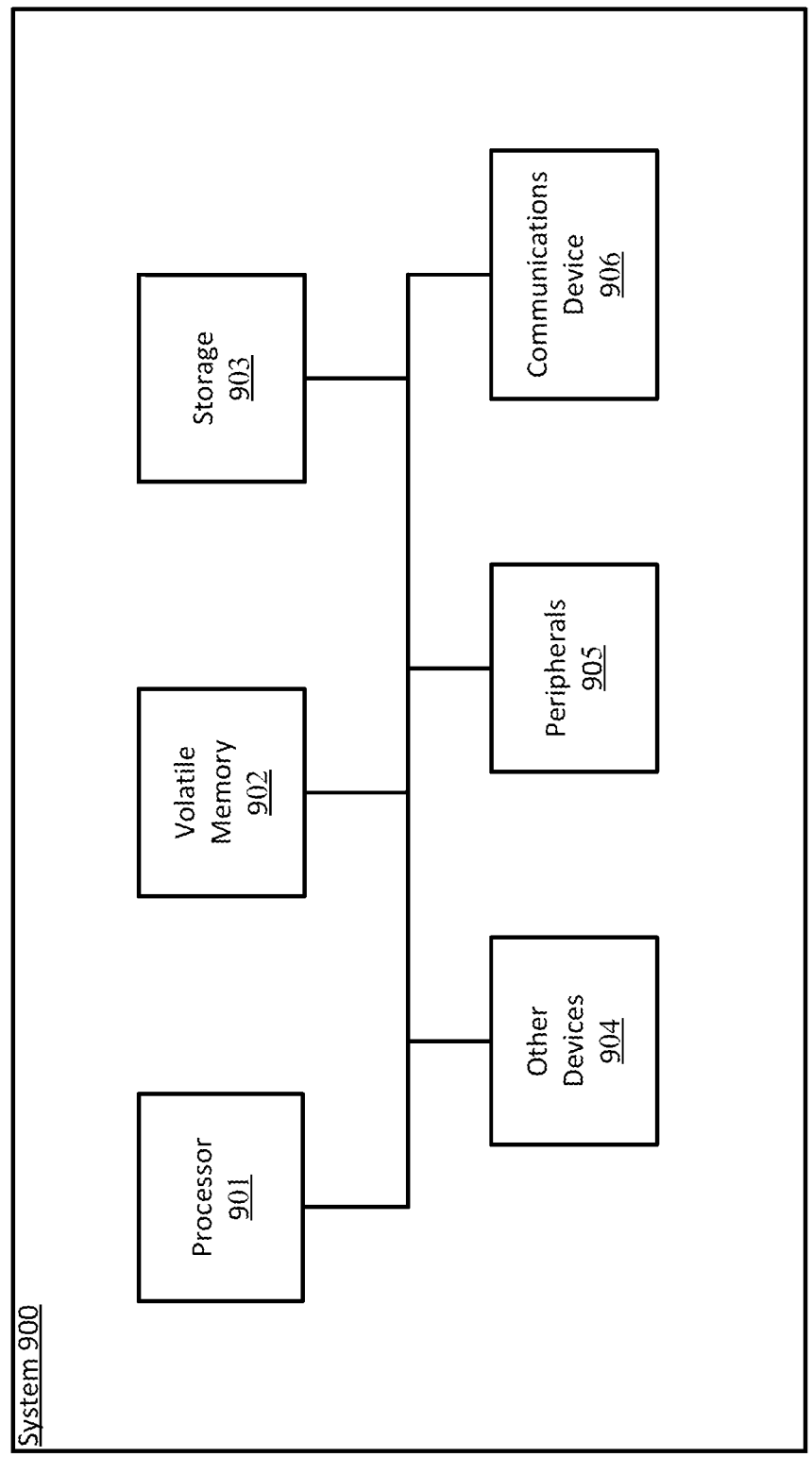
FIG. 9 is a diagram illustrating an exemplary computer system that may perform processing in some embodiments.

FIG. 9 is a diagram illustrating an exemplary computer that may perform processing in some embodiments. Exemplary computer 900 may perform operations consistent with some embodiments. The architecture of computer 900 is exemplary. Computers can be implemented in a variety of other ways. A wide variety of computers can be used in accordance with the embodiments herein.

Processor 901 may perform computing functions such as running computer programs. The volatile memory 902 may provide temporary storage of data for the processor 901. RAM is one kind of volatile memory. Volatile memory typically requires power to maintain its stored information. Storage 903 provides computer storage for data, instructions, and/or arbitrary information. Non-volatile memory, which can preserve data even when not powered and including disks and flash memory, is an example of storage. Storage 903 may be organized as a file system, database, or in other ways. Data, instructions, and information may be loaded from storage 903 into volatile memory 902 for processing by the processor 901.

The computer 900 may include peripherals 905. Peripherals 905 may include input peripherals such as a keyboard, mouse, trackball, video camera, microphone, and other input devices. Peripherals 905 may also include output devices such as a display. Peripherals 905 may include removable media devices such as CD-R and DVD-R recorders/players. Communications device 906 may connect the computer 900 to an external medium. For example, communications device 906 may take the form of a network adapter that provides communications to a network. A computer 900 may also include a variety of other devices 904. The various components of the computer 900 may be connected by a connection medium such as a bus, crossbar, or network.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "identifying" or "determining" or "executing" or "performing" or "collecting" or "creating" or "sending" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

Various general purpose systems may be used with programs in accordance with the teachings herein, or it may prove convenient to construct a more specialized apparatus to perform the method. The structure for a variety of these systems will appear as set forth in the description above. In addition, the present disclosure is not described with reference to any particular programming language. It will be appreciated that a variety of programming languages may be used to implement the teachings of the disclosure as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing disclosure, implementations of the disclosure have been described with reference to specific example implementations thereof. It will be evident that various modifications may be made thereto without departing from the broader spirit and scope of implementations of the disclosure as set forth in the following claims. The disclosure and drawings are, accordingly, to be regarded in an illustrative sense rather than a restrictive sense.

What is claimed is:

1. A communication system comprising one or more processors configured to perform the operations of:
    displaying a view menu, the view menu configured to receive a selection of a view layout, wherein the view layouts include a speaker view, a gallery view, and an active pane view;
    receiving, via the view menu, a selection of the active pane view;
    in response to receiving the selection of the active pane view, displaying a draggable active pane, wherein the active pane automatically switches between displaying video conference participants based on which video conference participant is speaking and the dimensions of the active pane are smaller than full screen;
    receiving a drag input from a user on the active pane and moving the active pane to a new location on the screen, the new location being near a camera capturing video of the user in the video conference; and
    displaying the active pane on the screen at the new location near the camera.

2. The system of claim 1, wherein the processors are further configured to perform the operations of:
    accessing system data to gather information about a device model of the computer system;
    accessing a database storing information about built-in camera physical locations for a plurality of device models to retrieve a built-in camera physical location for the device model of the computer system; and
    converting from the built-in camera physical location for the device model of the computer system to screen coordinates to generate screen coordinates on the computer system near the built-in camera physical location; and
    displaying the active pane at the screen coordinates on the computer system near the built-in camera physical location.

3. The system of claim 1, wherein the processors are further configured to perform the operations of:
    analyzing the captured video of the user in the video conference from the camera to detect one or more perspective lines;
    determining a physical location of the camera capturing video of the user in the video conference based on the one or more perspective lines;
    converting from the physical location of the camera to screen coordinates to generate screen coordinates on the computer system near the physical location of the camera; and
    displaying the active pane at the screen coordinates on the computer system near the physical location of the camera.

4. The system of claim 1, wherein the processors are further configured to perform the operations of:

analyzing the captured video of the user in the video conference from the camera to detect a face and a facing direction of the face;
determining whether the face is looking at the camera, and, when the face is not looking at the camera, determining an angle to rotate the face to look at the camera;
generating screen coordinates on the computer system that, when viewed by the user, rotate the face to look at the camera; and
displaying the active pane at the screen coordinates on the computer system that, when viewed by the user, rotate the face to look at the camera.

5. The system of claim 1, wherein the processors are further configured to perform the operations of:
determining a boundary about a first video conference participant in a set of video frames, wherein the boundary has an interior portion and an exterior portion;
generating, for display on one or more devices, a filtered video depicting the interior portion depicting imagery of the first video conference participant overlaid on a transparent or translucent background; and
displaying in the active pane the filtered video of the first video conference participant.

6. The system of claim 5, wherein the processors are further configured to perform the operations of:
displaying an opacity control setting for adjusting the opacity of the background on which the first video conference participant is overlaid; and
receiving an input opacity from the opacity control setting and adjusting the opacity of the background on which the first video conference participant is overlaid according to the input opacity.

7. The system of claim 5, wherein the processors are further configured to perform the operations of:
displaying shared content behind the active pane, the shared content comprising a view of content shared by one of the video conference participants; and
wherein the shared content is visible on the screen through the transparent or translucent background on which the first video conference participant is overlaid.

8. A computer-implemented method for providing an active pane within a communication platform, comprising:
displaying a view menu, the view menu configured to receive a selection of a view layout, wherein the view layouts include a speaker view, a gallery view, and an active pane view;
receiving, via the view menu, a selection of the active pane view;
in response to receiving the selection of the active pane view, displaying a draggable active pane, wherein the active pane automatically switches between displaying video conference participants based on which video conference participant is speaking and the dimensions of the active pane are smaller than full screen;
receiving a drag input from a user on the active pane and moving the active pane to a new location on the screen, the new location being near a camera capturing video of the user in the video conference; and
displaying the active pane on the screen at the new location near the camera.

9. The method of claim 8, further comprising:
accessing system data to gather information about a device model of the computer system;
accessing a database storing information about built-in camera physical locations for a plurality of device models to retrieve a built-in camera physical location for the device model of the computer system;
converting from the built-in camera physical location for the device model of the computer system to screen coordinates to generate screen coordinates on the computer system near the built-in camera physical location; and
displaying the active pane at the screen coordinates on the computer system near the built-in camera physical location.

10. The method of claim 8, further comprising:
analyzing the captured video of the user in the video conference from the camera to detect one or more perspective lines;
determining a physical location of the camera capturing video of the user in the video conference based on the one or more perspective lines;
converting from the physical location of the camera to screen coordinates to generate screen coordinates on the computer system near the physical location of the camera; and
displaying the active pane at the screen coordinates on the computer system near the physical location of the camera.

11. The method of claim 8, further comprising:
analyzing the captured video of the user in the video conference from the camera to detect a face and a facing direction of the face;
determining whether the face is looking at the camera, and, when the face is not looking at the camera, determining an angle to rotate the face to look at the camera;
generating screen coordinates on the computer system that, when viewed by the user, rotate the face to look at the camera; and
displaying the active pane at the screen coordinates on the computer system that, when viewed by the user, rotate the face to look at the camera.

12. The method of claim 8, further comprising:
determining a boundary about a first video conference participant in a set of video frames, wherein the boundary has an interior portion and an exterior portion;
generating, for display on one or more devices, a filtered video depicting the interior portion depicting imagery of the first video conference participant overlaid on a transparent or translucent background; and
displaying in the active pane the filtered video of the first video conference participant.

13. The method of claim 12, further comprising:
displaying an opacity control setting for adjusting the opacity of the background on which the first video conference participant is overlaid; and
receiving an input opacity from the opacity control setting and adjusting the opacity of the background on which the first video conference participant is overlaid according to the input opacity.

14. The method of claim 12, further comprising:
displaying shared content behind the active pane, the shared content comprising a view of content shared by one of the video conference participants;
wherein the shared content is visible on the screen through the transparent or translucent background on which the first video conference participant is overlaid.

15. A non-transitory computer storage medium that stores executable program instructions that when executed by one or more computing devices, configures the one or more computing devices to perform operations comprising:

displaying a view menu, the view menu configured to receive a selection of a view layout, wherein the view layouts include a speaker view, a gallery view, and an active pane view;

receiving, via the view menu, a selection of the active pane view;

in response to receiving the selection of the active pane view, displaying a draggable active pane, wherein the active pane automatically switches between displaying video conference participants based on which video conference participant is speaking and the dimensions of the active pane are smaller than full screen;

receiving a user input from a user on the active pane and displaying a visual indicator at the location of the user input that the active pane is draggable;

receiving a drag input from a user on the active pane and moving the active pane to a new location on the screen, the new location being near a camera capturing video of the user in the video conference; and displaying the active pane on the screen at the new location near the camera.

16. The non-transitory computer storage medium of claim 15, the operations further comprising:

accessing system data to gather information about a device model of the computer system;

accessing a database storing information about built-in camera physical locations for a plurality of device models to retrieve a built-in camera physical location for the device model of the computer system;

converting from the built-in camera physical location for the device model of the computer system to screen coordinates to generate screen coordinates on the computer system near the built-in camera physical location; and displaying the active pane at the screen coordinates on the computer system near the built-in camera physical location.

17. The non-transitory computer storage medium of claim 15, the operations further comprising:

analyzing the captured video of the user in the video conference from the camera to detect one or more perspective lines;

determining a physical location of the camera capturing video of the user in the video conference based on the one or more perspective lines;

converting from the physical location of the camera to screen coordinates to generate screen coordinates on the computer system near the physical location of the camera; and displaying the active pane at the screen coordinates on the computer system near the physical location of the camera.

18. The non-transitory computer storage medium of claim 15, the operations further comprising:

analyzing the captured video of the user in the video conference from the camera to detect a face and a facing direction of the face;

determining whether the face is looking at the camera, and, when the face is not looking at the camera, determining an angle to rotate the face to look at the camera;

generating screen coordinates on the computer system that, when viewed by the user, rotate the face to look at the camera; and displaying the active pane at the screen coordinates on the computer system that, when viewed by the user, rotate the face to look at the camera.

19. The non-transitory computer storage medium of claim 15, the operations further comprising:

determining a boundary about a first video conference participant in a set of video frames, wherein the boundary has an interior portion and an exterior portion;

generating, for display on one or more devices, a filtered video depicting the interior portion depicting imagery of the first video conference participant overlaid on a transparent or translucent background;

displaying in the active pane the filtered video of the first video conference participant.

20. The non-transitory computer storage medium of claim 19, the operations further comprising:

displaying an opacity control setting for adjusting the opacity of the background on which the first video conference participant is overlaid;

receiving an input opacity from the opacity control setting and adjusting the opacity of the background on which the first video conference participant is overlaid according to the input opacity.

21. The non-transitory computer storage medium of claim 19, the operations further comprising:

displaying shared content behind the active pane, the shared content comprising a view of content shared by one of the video conference participants;

wherein the shared content is visible on the screen through the transparent or translucent background on which the first video conference participant is overlaid.

* * * * *